United States Patent
Lu et al.

(10) Patent No.: US 11,765,243 B2
(45) Date of Patent: Sep. 19, 2023

(54) DATA PROCESSING METHOD, MULTI-CLOUD MANAGEMENT SYSTEM, AND RELATED DEVICE

(71) Applicant: HUAWEI TECHNOLOGIES CO., LTD., Shenzhen (CN)

(72) Inventors: Xin Lu, Shenzhen (CN); Liqing Su, Dongguan (CN); Yaobing Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/105,539

(22) Filed: Nov. 26, 2020

(65) Prior Publication Data

US 2021/0084108 A1   Mar. 18, 2021

Related U.S. Application Data

(63) Continuation of application No. PCT/CN2019/081169, filed on Apr. 3, 2019.

(30) Foreign Application Priority Data

May 31, 2018 (CN) ......................... 201810556527.0

(51) Int. Cl.
  *H04L 67/51* (2022.01)
  *H04L 41/5041* (2022.01)
  *H04L 67/565* (2022.01)

(52) U.S. Cl.
  CPC .......... *H04L 67/51* (2022.05); *H04L 41/5041* (2013.01); *H04L 67/565* (2022.05)

(58) Field of Classification Search
  None
  See application file for complete search history.

(56) References Cited

U.S. PATENT DOCUMENTS 8,549,125 B2    10/2013  Hamilton, II et al.
9,613,117 B1 *   4/2017  Meritt ................... G06F 16/196
(Continued)

FOREIGN PATENT DOCUMENTS

CN    102255933 A    11/2011
CN    102346669 A     2/2012
(Continued)

*Primary Examiner* — Lance Leonard Barry
(74) *Attorney, Agent, or Firm* — Leydig, Voit & Mayer, Ltd.

(57) ABSTRACT

A data processing method and a server are provided. In various embodiments, a service request for invoking the meta service is received, where the service request matches metadata of the meta service. In those embodiments, the service request is converted into a cloud service request packet based on metadata of a cloud service corresponding to the meta service, where the cloud service request packet matches the metadata of the meta service. Still in those embodiments, the cloud service request packet is sent to invoke the cloud service, and a cloud service response packet is received, where the cloud service response packet is an invocation result obtained by invoking the cloud service. Also in those embodiments, the cloud service response packet is then converted into a service response that matches the metadata of the meta service and sending the service response.

15 Claims, 10 Drawing Sheets

(56) References Cited

U.S. PATENT DOCUMENTS

| | | | |
|---|---|---|---|
| 10,154,112 B1* | 12/2018 | Anthony | G06F 3/0647 |
| 2012/0005262 A1* | 1/2012 | McWhirter | G06F 9/541 |
| | | | 719/328 |
| 2013/0066940 A1* | 3/2013 | Shao | H04L 67/1025 |
| | | | 709/201 |
| 2013/0080509 A1* | 3/2013 | Wang | H04L 12/66 |
| | | | 709/224 |
| 2013/0159256 A1* | 6/2013 | Fischer | G06F 11/1469 |
| | | | 707/649 |
| 2017/0364973 A1 | 12/2017 | Van Biljon et al. | |
| 2018/0083923 A1 | 3/2018 | Bian et al. | |
| 2021/0084108 A1* | 3/2021 | Lu | H04L 41/5041 |

FOREIGN PATENT DOCUMENTS

| | | | |
|---|---|---|---|
| CN | 102821116 A | 12/2012 | |
| CN | 102970356 A | 3/2013 | |
| CN | 103593229 A | 2/2014 | |
| CN | 103701834 A | 4/2014 | |
| CN | 104283910 A | 1/2015 | |
| CN | 104361017 A | 2/2015 | |
| CN | 104575502 A | 4/2015 | |
| CN | 104866976 A | 8/2015 | |
| CN | 105516269 A | 4/2016 | |
| CN | 106254471 A | 12/2016 | |
| CN | 106357739 A | 1/2017 | |
| CN | 106383717 A | 2/2017 | |
| CN | 106790455 A | 5/2017 | |
| CN | 107003906 A | 8/2017 | |
| CN | 107959548 A | 4/2018 | |
| CN | 108989384 A | 12/2018 | |
| WO | WO-2012092794 A1 * | 7/2012 | H04L 67/12 |

* cited by examiner

DATA PROCESSING METHOD, MULTI-CLOUD MANAGEMENT SYSTEM, AND RELATED DEVICE

CROSS-REFERENCE TO RELATED APPLICATIONS

This application is a continuation of International Application No. PCT/CN2019/081169, filed on Apr. 3, 2019, which claims priority to Chinese Patent Application No. 201810556527.0, filed on May 31, 2018. The disclosures of the aforementioned applications are hereby incorporated by reference in their entireties.

TECHNICAL FIELD

This application relates to the communications field, and in particular, to a data processing method, a multi-cloud management system, and a related device.

BACKGROUND

Cloudification of services or applications of enterprises is a current development trend for the enterprises. The enterprises rent a public cloud service to quickly obtain various information technology (IT) resources, such as a virtual machine, a database, and an application service. However, some enterprises that have offices across regions may need to rent resources provided by a plurality of cloud service providers because a specific cloud service provider cannot cover all regions of the enterprise.

In a multi-cloud management system, namely, a system in which a plurality of cloud services are introduced to provide a service, a cloud service provided by each cloud service provider needs to be adapted. An adaptation process may include a process in which, when a cloud service invocation request is initiated, original service input is converted into an input parameter format required by a corresponding cloud service. In an existing solution, an application programming interface (API) of the cloud service provided by each cloud service provider is customized and developed based on one-by-one analysis, and is integrated into a meta service provided by the multi-cloud management system. When cloud services are introduced, APIs of the cloud services provided by cloud service providers may be different from each other. For example, input parameter types or formats are different. Therefore, an increasing quantity of the introduced cloud services will exponentially increase development workloads and maintenance difficulty. For example, when a cloud service A1 from a cloud service provider is introduced, an API of the cloud service A1 needs to be learned. Code is written for adapting and invoking the cloud service A1. The code is compiled and packaged, and then the cloud service A1 is deployed. Each time a service is introduced, steps such as API learning, adaptation code writing, code compilation and packaging, and service deployment are repeated. Therefore, a large amount of code is required for adapting the meta service and the cloud service, resulting in a heavy workload of adapting the meta service and the cloud service. How to reduce the workload of adapting the meta service and the cloud service when the cloud service is introduced becomes a problem to be urgently resolved.

SUMMARY

Various embodiments provide a data processing method, a multi-cloud management system, and a related device, to implement lightweight access of a multi-cloud service through a metadata driver in the multi-cloud management system. This reduces a workload of adapting a meta service and a cloud service when the cloud service is introduced.

In view of this, a first aspect of various examples provides a data processing method, including:

first receiving, by a multi-cloud management server, a service request from a network device, where the service request is used to request to invoke a meta service, the service request includes a parameter that matches metadata of the meta service, and the meta service is a service provided for a user; then converting, by the multi-cloud management server, the service request into a cloud service request packet based on metadata of a cloud service, and sending the cloud service request packet, where the cloud service is a service provided for the meta service, and the meta service corresponds to the cloud service (in other words, the meta service is a service provided based on an invocation result of the cloud service); when the meta service is invoked, invoking the cloud service to obtain a service response for invoking the meta service, where the service request needs to be converted into the cloud service request packet corresponding to the cloud service, to invoke the cloud service; and receiving, by the multi-cloud management server, a cloud service response packet, converting the cloud service response packet into a service response, and sending the service response, where the cloud service response packet is a result obtained by invoking the cloud service, the metadata of the cloud service includes a parameter that matches the cloud service response packet, and the service response matches the metadata of the meta service.

It should be noted that in this implementation, after the multi-cloud management server converts the service request into the cloud service request packet, the multi-cloud management server may send the cloud service request packet to at least one cloud service device that provides the cloud service. After the multi-cloud management server converts the cloud service response packet into the service response, the multi-cloud management server may send the service response to the network device. The network device may match the service response with the metadata of the meta service, to obtain information carried in the service response.

In an implementation, the metadata of the meta service and the metadata of the cloud service are first configured. The metadata of the meta service and the metadata of the cloud service may be used to complete, between the meta service and the cloud service, conversion between the service request and the request packet and conversion between the cloud service response packet and the service response of the meta service, to complete adaptation of the meta service and the cloud service. In addition, steps such as one-by-one code customization, code compilation and packaging, and integration and deployment of the cloud service do not need to be performed. Therefore, this reduces an amount of code and a workload of adapting the cloud service and the meta service.

In some embodiments, in some example implementations:

The metadata of the meta service has a first preset format. The metadata of the meta service matches a parameter of the meta service, and data included in the metadata of the meta service may be obtained through configuration performed by the multi-cloud management server based on all or some parameters of the meta service. The metadata of the cloud service has a second preset format, the metadata of the cloud service matches a parameter of the cloud service, and there is a mapping relationship between the metadata of the cloud service and the metadata of the meta service. Data included in the metadata of the cloud service may be obtained through configuration performed by the multi-cloud management server based on all or some parameters of the cloud service. In addition, all or some parameters of the meta service may correspond to all or some parameters of the cloud service. For example, a data type of an access parameter of the meta service may be the same as a data type of an access parameter of the cloud service.

In an implementation, the multi-cloud management server configures the metadata of the meta service and the metadata of the cloud service, and there is the mapping relationship between the metadata of the meta service and the metadata of the cloud service. The service request may be converted, based on the mapping relationship, into a request packet corresponding to the cloud service, namely, the cloud service request packet. The cloud service response packet may also be converted, based on the mapping relationship, into the service response corresponding to the meta service. This implements adaptation of the meta service and the cloud service.

In some embodiments, in some example implementations, the converting the service request into a cloud service request packet based on metadata of a cloud service may include:

matching, by the multi-cloud management server, the metadata of the meta service with the service request; obtaining, based on the metadata of the meta service, information carried in the service request; and performing, based on the metadata of the cloud service, parameter mapping on the information carried in the service request, to obtain the cloud service request packet.

In an implementation, the metadata of the meta service and the metadata of the cloud service may be used to complete conversion between the service request of the meta service and the cloud service request packet. This may be adapted to conversion between request packets of different cloud services, and shield an invocation difference between different cloud services.

In some embodiments, in some example implementations, the performing, based on the metadata of the cloud service, parameter mapping on the information carried in the service request, to obtain the cloud service request packet may include:

determining, by the multi-cloud management server based on the mapping relationship between the metadata of the meta service and the metadata of the cloud service, a first packet structure, in the metadata of the cloud service, corresponding to the information carried in the service request, where the first packet structure includes an arrangement format, in the metadata of the cloud service, corresponding to the information carried in the service request; and performing, based on the arrangement format included in the first packet structure, arrangement, data type conversion, or the like on the information carried in the service request, to generate the cloud service request packet.

In an implementation, the mapping relationship between the metadata of the meta service and the metadata of the cloud service may be used to complete the conversion between the service request of the meta service and the cloud service request packet. This may be adapted to conversion between request packets of different cloud services, and shields an invocation difference between different cloud services.

In some embodiments, in some example implementations, converting the cloud service response packet into the service response that matches the metadata of the meta service, and sending the service response may include:

matching, by the multi-cloud management server, the metadata of the cloud service with the cloud service response packet, to obtain information carried in the cloud service response packet; and mapping the information carried in the cloud service response packet to the metadata of the meta service, to generate the service response, and sending the service response to the network device, where the network device is a device that sends the service request.

In this implementation, the multi-cloud management server may determine, based on the metadata of the cloud service, the information carried in the cloud service response packet. In addition, the multi-cloud management server may use the information carried in the cloud service response packet to generate, based on the metadata of the meta service, the service response corresponding to the meta service, and send the service response to the network device, such that the network device obtains the invocation result of the cloud service. This can implement conversion between responses of different cloud services, to complete response adaptation between the meta service and the cloud service. Further, this avoids a large quantity of steps such as one-by-one code customization, code compilation and packaging, and integration and deployment of the cloud service, and reduces the workload of adapting the meta service and the cloud service.

In some embodiments, in some example implementations, generating the service response based on the information carried in the cloud service response packet and the metadata of the meta service, and sending the service response may include:

determining, by the multi-cloud management server based on the mapping relationship between the metadata of the meta service and the metadata of the cloud service, a second packet structure, in the metadata of the meta service, corresponding to the information carried in the cloud service response packet, where the second packet structure includes an arrangement format, in the metadata of the meta service, corresponding to the information carried in the response packet; and performing, by the multi-cloud management server based on the arrangement format included in the second packet structure, data type conversion, arrangement, and the like on the information carried in the response packet, to generate the service response, and sending the service response to the network device.

In this implementation, the multi-cloud management server determines, based on a mapping relationship between the meta service and the cloud service, a packet structure, in the metadata of the meta service, corresponding to the information carried in the cloud service response packet, and converts the response packet based on the packet structure to obtain the service response corresponding to the meta service, so as to implement the response adaptation between the meta service and the cloud service. This is adapted to a response difference between different cloud services, avoids a large quantity of steps such as one-by-one code customization, code compilation and packaging, and integration and deployment of the cloud service, and reduces the workload of adapting the meta service and the cloud service.

In some embodiments, in some example implementations:

The metadata of the meta service may include an access parameter and a response parameter that are of the meta service. The access parameter is a request parameter for invoking the meta service, and the response parameter is a parameter obtained after the meta service is invoked.

The metadata of the cloud service may include a mapping relationship, a service address, service orchestration, parameter mapping, and response mapping that are of the cloud service. The mapping relationship is used to indicate a relationship between the cloud service and the meta service. The service address is an address of the cloud service. The service orchestration is an arrangement manner of an application programming interface API corresponding to the cloud service. The parameter mapping is used to indicate an arrangement format and an expression format, of the access parameter of the meta service, in the metadata of the cloud service. The response mapping is used to indicate the information carried in the cloud service response packet and a corresponding arrangement format of the response parameter in the metadata of the meta service.

It should be noted that in this implementation, in addition to the access parameter and the response parameter of the meta service, the metadata of the meta service may further include information such as a service name and a service address of the meta service. In addition to the mapping relationship, the service address, the service orchestration, the parameter mapping, and the response mapping of the cloud service, the metadata of the cloud service may further include other information, for example, address information of the cloud service and information about the API of the cloud service. This is not specifically limited herein.

In some embodiments, in some example implementations, after the receiving a service request and before the receiving a cloud service response packet, the method may further include:

determining, by the multi-cloud management server based on the parameter carried in the service request, a mapping relationship of the meta service, or the like, the cloud service corresponding to the service request, and sending the cloud service request packet to the at least one cloud service device that provides the cloud service, to invoke the cloud service.

It should be understood that, in this implementation of this example, if the service request corresponds to a plurality of cloud services, the multi-cloud management server may alternatively generate a plurality of cloud service request packets based on metadata of each cloud service. The cloud service request packets may be in a one-to-one correspondence with the cloud services. When the plurality of cloud services are invoked, the multi-cloud management server separately sends the cloud service request packet to at least one cloud service device that provides a corresponding cloud service.

In an implementation, the multi-cloud management server may determine the cloud service corresponding to the service request, and send, to the at least one cloud service device that provides the cloud service, the cloud service request packet obtained by converting the service request, to invoke the cloud service. The metadata of the meta service and the metadata of the cloud service may be used to implement the conversion between the service request and the cloud service request packet, and the cloud service request packet may be used to invoke the cloud service. This may be adapted to an invocation difference between different cloud services.

A second aspect of various examples provides a data processing method, including:

generating and sending, by a network device, a service request, where the service request is used to request to invoke a meta service, the service request includes a parameter that matches metadata of the meta service, and the meta service is a service deployed on the network device and provided for a user; and receiving, by the network device, a service response from a multi-cloud management server, where the service response matches the metadata of the meta service.

In this implementation, the network device may generate the service request based on the metadata, of the meta service, configured by the multi-cloud management server, and obtain, based on the metadata of the meta service, information carried in the service response. Therefore, in an implementation of this example, the metadata of the meta service may be used to invoke the meta service, and there is no need to perform, at the meta service on one or more cloud services corresponding to the meta service, steps such as one-by-one code customization, code compilation and packaging, and integration and deployment of the cloud service. This simplifies a process of deploying the cloud service on the network device, and reduces a workload of adapting the meta service and the cloud service.

In some embodiments, in some example implementations, after the receiving a service response, the method may further include:

obtaining, by the network device based on a preset format included in the metadata of the meta service, the information carried in the service response, where the service response is obtained after the multi-cloud management server converts a cloud service response packet based on metadata of the cloud service, the cloud service is a service provided for the meta service, the cloud service response packet is obtained by invoking the cloud service, the cloud service corresponds to the meta service (in other words, the cloud service is the service provided for the meta service), and the meta service is a service provided based on an invocation result of the cloud service.

In an implementation, after the service response from the multi-cloud management server is received, the information carried in the service response may be obtained based on the metadata of the meta service. Therefore, in this implementation, the network device may extract the information from the service response based on the metadata of the meta service, to obtain invocation information of invoking a corresponding cloud service.

In some embodiments, in some example implementations, the generating and sending, by a network device, a service request may include:

generating, by the network device, the service request based on the metadata of the meta service, where the service request has a first preset format, the metadata of the meta service matches a parameter of the meta service, and the metadata of the meta service includes data obtained based on the parameter of the meta service when the metadata of the meta service is configured; sending, by the network device, the service request to the multi-cloud management server; converting, by the multi-cloud management server based on the metadata of the cloud service, the service request into a cloud service request packet corresponding to the cloud service; invoking the corresponding cloud service through the cloud service request packet, to obtain the cloud service response packet; and converting the cloud service response packet into the service response corresponding to the metadata of the meta service, and then sending the service response to the network device.

Therefore, in this implementation, after generating the service request, the network device sends the service request to the multi-cloud management server, to obtain the service response fed back by the multi-cloud management server. There is no need to generate a request packet for each cloud service. This simplifies a process of invoking the meta service on a network device side.

In some embodiments, in some example implementations:

The metadata of the meta service has a first preset format, and the metadata of the meta service matches the parameter of the meta service. The metadata of the cloud service has a second preset format, and the metadata of the cloud service matches a parameter of the cloud service. There is a mapping relationship between the metadata of the cloud service and the metadata of the meta service.

In an implementation, there is the mapping relationship between the metadata of the meta service and the metadata of the cloud service. The service request may be converted, based on the mapping relationship, into a request packet corresponding to the cloud service, namely, the cloud service request packet. The cloud service response packet may also be converted, based on the mapping relationship, into the service response corresponding to the meta service. This implements the adaptation of the meta service and the cloud service.

In some embodiments, in some example implementations:

The metadata of the meta service includes an access parameter and a response parameter that are of the meta service. The access parameter is a request parameter for invoking the meta service, and the response parameter is a parameter obtained after the meta service is invoked. The metadata of the cloud service includes a mapping relationship, a service address, service orchestration, parameter mapping, and response mapping that are of the cloud service. The mapping relationship is used to indicate a relationship between the cloud service and the meta service. The service address is an address of the cloud service. The service orchestration is an arrangement manner of an application programming interface API corresponding to the cloud service. The parameter mapping is used to indicate an arrangement format and an expression format, of the access parameter of the meta service, in the metadata of the cloud service. The response mapping is used to indicate information carried in the cloud service response packet and a corresponding arrangement format of the response parameter in the metadata of the meta service.

It should be noted that in this implementation, in addition to the access parameter and the response parameter of the meta service, the metadata of the meta service may further include information such as a service name and a service address of the meta service. In addition to the mapping relationship, the service address, the service orchestration, the parameter mapping, and the response mapping of the cloud service, the metadata of the cloud service may further include other information, for example, address information of the cloud service and information about the API of the cloud service. This is not specifically limited herein.

A third aspect of the embodiments provides a multi-cloud management server, and the management device has a function of implementing the data processing method in the first aspect. The function may be implemented by hardware, or may be implemented by hardware executing corresponding software. The hardware or the software includes one or more modules corresponding to the function.

A fourth aspect of various embodiments provides a network device, and the management device has a function of implementing the data processing method in the second aspect. The function may be implemented by hardware, or may be implemented by hardware executing corresponding software. The hardware or the software includes one or more modules corresponding to the function.

A fifth aspect of the embodiments of various examples provides a multi-cloud management server, and the multi-cloud management server may include:

a processor, a memory, and an input/output interface, where the processor, the memory, and the input/output interface are coupled, the memory is configured to store program code, and when invoking the program code in the memory, the processor performs the steps performed by the multi-cloud management server provided in the first aspect or any one of the implementations of the first aspect of this example.

A sixth aspect of the embodiments of various examples provides a network device, and the network device may include:

a processor, a memory, and an input/output interface, where the processor, the memory, and the input/output interface are coupled, the memory is configured to store program code, and when invoking the program code in the memory, the processor performs the steps performed by the network device provided in the second aspect or any one of the implementations of the second aspect of this example.

A seventh aspect of the embodiments of various examples provides a multi-cloud management system. The multi-cloud management system includes at least one multi-cloud management server and at least one network device. The at least one multi-cloud management server is the multi-cloud management server that performs any implementation of the first aspect or the multi-cloud management server provided in the third aspect. The network device is the network device that performs any implementation of the second aspect or the network device provided in the fourth aspect.

An eighth aspect of various embodiments provides a storage medium. It should be noted that the technical solutions of this application essentially, or the part contributing to the prior art, or all or some of the technical solutions may be implemented in a form of a software product. The computer software product is stored in a storage medium, and is configured to store a computer software instruction used by the foregoing device. The computer software instruction includes a program designed for the multi-cloud management server or the network device to perform the first aspect or the second aspect.

The storage medium includes various media that may store program code, such as a USB flash drive, a removable hard disk, a read-only memory (ROM), a random access memory (RAM), a magnetic disk, or an optical disc.

A ninth aspect of the embodiments of this application provides a computer program product including an instruction. When the computer program product runs on a computer, the computer is enabled to perform the method according to any one of the optional implementations of the first aspect or the second aspect of this application.

It can be learned from the foregoing technical solutions that the embodiments of this application have the following advantages: The meta service is the service provided for the user, the cloud service corresponds to the meta service, and the cloud service is the service provided for the meta service. After the service request for invoking the meta service is received (the service request includes the parameter that matches the metadata of the meta service), the service request is converted into the cloud service request packet that matches the corresponding cloud service. In addition, after the cloud service response packet is received, the cloud service response packet is converted into the service response that matches the metadata of the meta service, and the service response is sent to the network device corresponding to the service request. Therefore, in the implementations of this application, the metadata of the meta service and the metadata of the cloud service may be used to complete the conversion between the request packet and the response packet, to implement the adaptation of the cloud service and the meta service. There is no need to perform one-by-one code adaptation. This reduces the amount of code and the workload of adapting the cloud service and the meta service when the cloud service is introduced.

DESCRIPTION OF EMBODIMENTS

Figure 1:
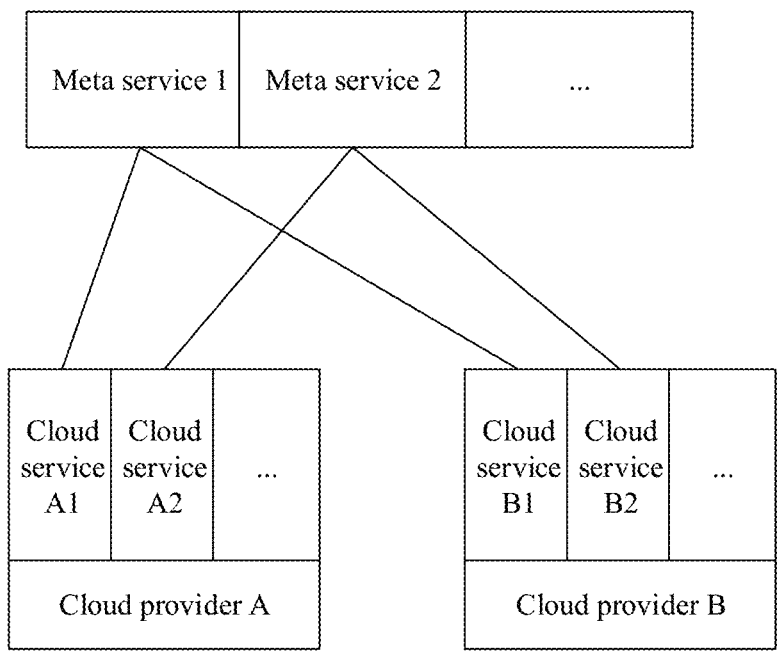
FIG. 1 is a schematic diagram of a cloud service invocation manner in an existing solution.

This application provides a data processing method, a multi-cloud management system, and a related device, to implement lightweight access of a multi-cloud service through a metadata driver in the multi-cloud management system. This reduces a workload of adapting a meta service and a cloud service when the cloud service is introduced.

In the multi-cloud management system in accordance with this disclosure, the meta service is a service provided for a user, for example, a translation service or a navigation service. One meta service corresponds to one or more cloud services, and the one or more cloud services are services provided for the meta service. When the meta service corresponds to one cloud service, the meta service may be a service provided directly based on an invocation result of the cloud service, or a service provided based on a processed invocation result of the cloud service. When the meta service corresponds to one cloud service, an invocation result of the cloud service may be used as a service response of the meta service. When the meta service corresponds to a plurality of cloud services, the meta service may be a service provided after the plurality of cloud services are processed. When the meta service is invoked, a cloud service corresponding to the meta service needs to be further invoked. After the corresponding cloud service is invoked, an invocation result is obtained, and then the invocation result is integrated. After integration, an integrated invocation result is used as a service response for invoking the meta service. For example, if an enterprise provides the translation service for the user, the enterprise needs to rent a cloud translation service, namely, a cloud service provided by a cloud provider, and provide the cloud translation service for the translation service. For instance, when the translation service is invoked, the translation service invokes the cloud service. After an invocation result of the cloud translation service is obtained, the invocation result of the cloud translation service is processed. The invocation result of the cloud translation service is used as a service response of the translation service.

Therefore, when the meta service is requested to be invoked, the cloud service provided by the cloud provider needs to be further invoked, to obtain the service response for invoking the meta service. The service response is a meta service response packet that matches metadata of the meta service. When the cloud service is introduced, invocation of cloud services differs, for example, types or quantities of invoked parameters are different. Therefore, the cloud service needs to be integrated and adapted, such that the cloud service is invoked when a service request from the user is received, to provide a required service for the user. For example, if the multi-cloud management system provides the translation service for the user, cloud translation A provided by a cloud provider A and cloud translation B provided by a cloud provider B are introduced. In addition, a parameter type, a parameter quantity, and the like of an API of the cloud translation A are different from those of an API of the cloud translation B.

Therefore, the multi-cloud management system needs to provide a customized translation API for the user to invoke, and enable the customized translation API to adapt to the cloud translation A and the cloud translation B. In this way, when using the translation service provided by the multi-cloud management system, the user may invoke the cloud translation A and the cloud translation B, to obtain an accurate translation result.

A cloud service adaptation method provided in an existing solution is to perform one-by-one code customization and development on each introduced cloud service. The method includes: obtaining data (including an address, a request input parameter, or a name of each API) of each cloud service provided by the cloud provider; compiling adaptation code, for each parameter of each cloud service, corresponding to a meta service; and compiling and packaging the code. Then, deployment is performed for a corresponding meta service, including adding, to the meta service through encoding, an invocation parameter and an invocation interface of a cloud service corresponding to the meta service.

Therefore, each time a cloud service is introduced, steps such as code adaptation and compilation and packaging need to be performed on the introduced cloud service, and deployment needs to be performed for a meta service. As an amount of code for introducing the cloud service increases linearly, an amount of code for implementing introduction of the cloud service is very large.

A specific manner of invoking a meta service and a cloud service in an existing solution may be shown in FIG. 1.

The meta service is a service provided for a user, the cloud service is provided by a cloud provider, and the meta service is a service provided based on an invocation result of a corresponding cloud service. For example, the meta service uses the invocation result of the corresponding cloud service as a service response, or uses a processed invocation result of the corresponding cloud service as the service response. One meta service may correspond to one or more cloud services.

When the user invokes a meta service 1, the user may choose to invoke a cloud service A1 and/or a cloud service B1 on a network device that provides the meta service, or the network device determines to invoke the cloud service A1 and/or the cloud service B1. A parameter corresponding to the cloud service A1 and/or the cloud service B1 is entered. Then, the network device sends, in a preset format, the parameter corresponding to the cloud service A1 and/or the cloud service B1 to a cloud service device corresponding to the cloud service A1 and/or the cloud service B1. The cloud service device invokes the cloud service A1 and the cloud service B1 based on information from the network device that provides the meta service. Then, the network device that provides the meta service processes, according to an adaptation manner preset for each cloud service, a response result of invoking the cloud service A1 and the cloud service B1, to obtain the service response.

If a cloud service C needs to be introduced, the meta service 1 corresponding to the cloud service C and parameters such as a service address and a request input parameter of the meta service 1 are first determined. Then, code is written, compiled, and packaged, and deployment is performed for the meta service 1. For example, an invocation interface of the cloud service C is added to the meta service 1.

Therefore, each time a cloud service is introduced, to complete adaptation of the introduced cloud service and the meta service, code adaptation needs to be separately customized for a corresponding meta service based on the introduced cloud service, and the cloud service needs to be deployed for the corresponding meta service. More code is required for implementation of more introduced cloud services. This results in an exponentially increasing amount of code used for adapting the meta service and the cloud service, and results in a very heavy workload of adapting the meta service and the cloud service.

To reduce the workload of adapting the meta service and the cloud service when the cloud service is introduced, various embodiments can provide a data processing method, a multi-cloud management system, and a related device.

Figure 2:
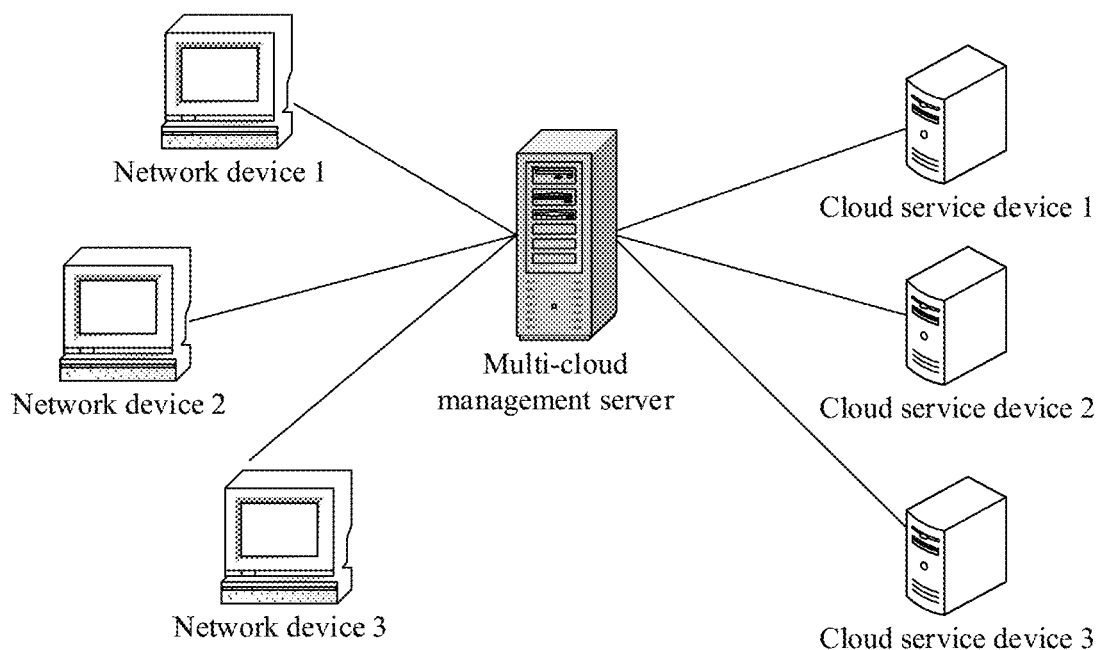
FIG. 2 is a network architectural diagram of a data processing method according to an embodiment of this application.

First, a network architecture to which the data processing method provided in accordance with the present disclosure is applicable is shown in FIG. 2. The network architecture may include a network device, a multi-cloud management server, a cloud service device, and the like. The network device may include a network device 1, a network device 2, and a network device 3. The cloud service device may include a cloud service device 1, a cloud service device 2, and a cloud service device 3. The network device, the multi-cloud management server, and the cloud service device jointly form the multi-cloud management system in the embodiments of this application.

It should be understood that in FIG. 2, only three network devices and three cloud service devices are used as an example. In actual application, there may be one or more network devices, and there may be one or more cloud service devices. "A plurality of" means two or more. This is further adjusted based on an actual scenario, and is not limited herein.

The network device and the multi-cloud management server may be coupled through a wireless network or a wired network, and the multi-cloud management server and the cloud service device may be coupled through the wireless network or the wired network.

Data may be transmitted between the network device and the multi-cloud management server, and between the multi-cloud management server and the cloud service device over a preset protocol, for example, a transmission control protocol (TCP), an internet protocol (IP), or the like.

The network device is a device that requests a cloud service, and the network device provides a meta service for a user. The network device may be one or more terminal devices, servers, or the like.

When the network device is a terminal device, for example, a mobile phone, a tablet computer, a desktop computer, or a vehicle-mounted terminal, the terminal device generates a service request based on information about an invoked meta service, sends the service request through the multi-cloud management server, and receives a service response through the multi-cloud management server. The terminal device may display, on a display interface, information included in the service response, store the service response into a database, or the like.

When the network device is a server, the server may request to invoke the cloud service by entering an invocation instruction, invocation information, or the like on the server. After requesting to invoke the cloud service, the server obtains a service response for invoking the cloud service. The service response may be from the multi-cloud management server. The server may display, on a built-in or an external display interface, information carried in the service response, or store the information carried in the service response into the database, or the like.

The cloud service device is configured to provide the cloud service. There may be one or more cloud services. In actual application, one cloud service device may provide one or more cloud services, and one cloud service may also be provided by one or more cloud service devices. It should be understood that "a plurality of" in the embodiments of this application means two or more.

The multi-cloud management server may include one or more central processing units (CPU), a memory, an input/output interface, and the like. In the data processing method in accordance with the present disclosure, a step performed by the multi-cloud management server is mainly performed by the one or more CPUs.

The multi-cloud management server may be one server or a plurality of distributed servers. When the multi-cloud management server is one server, the step performed by the multi-cloud management server in the data processing method in accordance with the present disclosure is processed by the server. If the multi-cloud management server is a plurality of distributed servers, the step performed by the multi-cloud management server in the data processing method in accordance with the present disclosure may be performed by one, more, or a specified server of the plurality of distributed servers.

In the data processing method provided in accordance with the present disclosure, the multi-cloud management server implements adaptation of the meta service and the cloud service based on metadata configuration, to reduce a workload of adapting the cloud service. The metadata configuration mainly includes configuring metadata of the meta service and configuring metadata of an introduced cloud service. Data included in the metadata of the cloud service corresponds to data included in metadata of a corresponding meta service. The configured metadata of the cloud service may include a parameter corresponding to the meta service in a parameter of the cloud service.

The metadata of the meta service has a first preset format, and the data included in the metadata of the meta service matches a parameter of the meta service. The metadata of the cloud service has a second preset format, and the data included in the metadata of the cloud service matches the parameter of the cloud service. There is a mapping relationship between the data included in the metadata of the meta service and the data included in the metadata of the cloud service. The metadata of the meta service and the metadata of the cloud service may be used to implement data conversion between the meta service and the cloud service, to complete adaptation of the meta service and the introduced cloud service.

The metadata of the meta service is data generated based on the first preset format by using related data, of the meta service, corresponding to the cloud service. Configuring the metadata of the meta service further includes: The multi-cloud management server determines the related data of the meta service. The related data of the meta service includes a parameter corresponding to the cloud service in the parameter of the meta service. The related data of the meta service may include an access parameter for invoking the meta service, information carried in a service response, a service address and a service name of the meta service, or the like. Then, the multi-cloud management server determines a description of each parameter or information in the related data of the meta service in a preset manner, including but not limited to determining the description based on a parameter type, parameter content, or the like. Then, a data structure corresponding to the meta service and data, corresponding to the meta service, in the data structure corresponding to the meta service are generated based on the description of each parameter in the related data of the meta service. The data structure corresponding to the meta service and the data, corresponding to the meta service, in the data structure of the meta service are the metadata of the meta service.

The metadata of the cloud service is data generated in the second preset format by using related data of the cloud service. Configuring the metadata of the cloud service includes: The multi-cloud management server obtains the related data of the cloud service, for example, an API of the cloud service, a request input parameter of the API, and a data format carried in a response packet. Then, the multi-cloud management server determines a description of each parameter or information in the related data of the cloud service. Then, a data structure corresponding to the cloud service and data, corresponding to the cloud service, in the data structure corresponding to the cloud service are generated based on the description of each parameter or information in the related data of the cloud service. The data structure corresponding to the cloud service and the data, corresponding to the cloud service, in the data structure corresponding to the cloud service are the metadata of the cloud service.

If the meta service corresponds to the cloud service, there is the mapping relationship between the data included in the metadata of the meta service and the data included in the metadata of the cloud service. The parameter included in the metadata of the meta service has a corresponding sequence, format, or the like in the metadata of the cloud service. For example, if the metadata of the meta service includes the access parameter, the metadata of the cloud service includes a parameter corresponding to the access parameter.

When invoking the meta service, after receiving a service request, for invoking the meta service, from the network device, the multi-cloud management server determines the cloud service that needs to be invoked based on the service request. A parameter carried in the service request matches the metadata of the meta service. Therefore, the multi-cloud management server may determine, based on the metadata of the meta service, information carried in the service request. The multi-cloud management server uses the information carried in the service request to generate, based on an arrangement format in a first packet structure corresponding to the metadata of the cloud service, a request packet adapted to the cloud service, namely, a cloud service request packet. The first packet structure includes an arrangement sequence, a format, or the like, of the information carried in the service request, in the metadata of the cloud service. Then, the multi-cloud management server sends the request packet to the cloud service device, to request to invoke the cloud service.

The multi-cloud management server receives a response packet, for invoking the cloud service, from the cloud service device. The response packet includes an invocation result obtained by invoking the cloud service, and the metadata of the cloud service includes data that matches a format and content of the response packet. The multi-cloud management server obtains, based on the metadata of the cloud service, information carried in the response packet, and converts, based on a second packet structure corresponding to the metadata of the meta service, the information carried in the response packet, to obtain a service response that matches the metadata of the meta service, namely, a meta service response packet. Then, the multi-cloud management server transmits the service response to the network device. The second packet structure includes an arrangement format and an expression format, in the metadata of the meta service, corresponding to the information carried in the response packet. The network device may extract data in the service response to obtain a result of invoking the meta service, and complete invocation of the meta service.

In this embodiment, adaptation of the cloud service is completed through the metadata configuration (including configuring the metadata of the meta service and configuring the metadata of the cloud service when the cloud service is introduced), to obtain the metadata of the meta service and the metadata of the cloud service. The metadata of the meta service and the metadata of the cloud service may be used by the multi-cloud management server to convert data between the meta service and the cloud service, to implement the adaptation of the meta service and the cloud service. Therefore, data conversion between the cloud service and the meta service may be completed through the metadata provided that the metadata configuration is performed on the meta service and the cloud service. In addition, data of the cloud service needs to be added and adapted on the network device only based on the configured metadata of the cloud service. This reduces an amount of code used for encoding information related to the introduced cloud service, deploying the cloud service, and integrating and deploying a plurality of cloud services on the network device when the cloud service is introduced. In other words, there is no need to perform one-by-one code customization and code compilation and packaging on the introduced cloud service, or deploy related data and code of the introduced cloud service for the meta service. This simplifies a process of adapting the introduced cloud service. For example, processes such as encoding and code compilation and packaging are reduced. In addition, this reduces an amount of code used for adapting the cloud service and the meta service when the cloud service is introduced, reduces a workload of introducing the cloud service, and improves efficiency of adapting the introduced cloud service and the meta service.

For example, if a meta service 1 corresponds to one cloud service, the cloud service needs to be introduced for the meta service 1. In the data processing method provided in this embodiment, the multi-cloud management server first determines related data of the meta service 1 and the cloud service 1, and the multi-cloud management server configures metadata for the related data of the meta service 1 and the cloud service. Metadata of the meta service and metadata of the cloud service may be used to complete data conversion between the meta service and the cloud service, for example, conversion of a request packet and a response packet, to complete adaptation of one introduced cloud service. In addition, when the network device adapts one cloud service, the adaptation of the cloud service may be completed provided that the network device performs specific deployment based on the metadata, of the cloud service, defined by the multi-cloud management server, and does not need to perform a large amount of different encoding based on different cloud services. For example, the network device adds an access parameter, an invocation interface, and the like of the cloud service to the meta service.

If ten cloud services corresponding to the meta service 1 need to be introduced subsequently, similarly adaptation of the ten cloud services may be completed provided that the multi-cloud management server configures metadata for the ten cloud services, and introduces, on the network device, an access parameter, an invocation interface, and the like based on the metadata of the ten cloud services.

However, in an existing solution, if the meta service 1 corresponds to one cloud service, the cloud service needs to be introduced for the meta service 1. First, a related parameter or information of the cloud service needs to be obtained. Then, one-by-one code customization, code compilation, and deployment for the meta service 1 are performed, to complete adaptation of the cloud service. This requires a large amount of code. If ten cloud services corresponding to the meta service 1 need to be introduced subsequently, the following needs to be separately performed on the ten cloud services: code customization, code compilation, and deployment for the meta service 1. In addition, after it is determined that each corresponding cloud service is deployed, integration, deployment, and rollout are performed on all cloud services corresponding to the meta service. Therefore, in the existing solution, code adaptation, code compilation, service deployment, and the like need to be separately performed on different meta services and different cloud services. Implementation is relatively complex, and a large amount of code is required.

In one implementation after the related parameter or information corresponding to the cloud service is determined, according to the data processing method provided in accordance with the present disclosure, the metadata of the meta service is configured, and the metadata of the cloud service is configured. In addition, the metadata of the meta service and the metadata of the cloud service are used to convert the cloud service request packet and a cloud service response packet. Adaptation of different meta services and different cloud services is implemented through metadata configuration. In addition, adaptation of the introduced cloud service may be completed provided that the network device performs deployment based on the metadata, of the cloud service, defined by the multi-cloud management server, for example, adds a parameter and an interface of the cloud service. Compared with the existing solution in which one-by-one code customization, code compilation and packaging, meta service deployment, and integration and deployment of a plurality of cloud services are performed, this method can reduce an amount of code used for adapting the introduced cloud service. In addition, the method can reduce processes, related to the cloud service, performed for the meta service such as code customization, code compilation and packaging, and integration and deployment of a plurality of cloud services, to reduce a workload of introducing the cloud service and improve efficiency of adapting the introduced cloud service and the meta service. Especially in a scenario in which there are a plurality of meta services and a plurality of cloud services, the multi-cloud management server implements adaptation of the meta service and the cloud service through metadata configuration, without requiring a large amount of code. This can effectively reduce a workload of adapting the cloud service.

Figure 3:
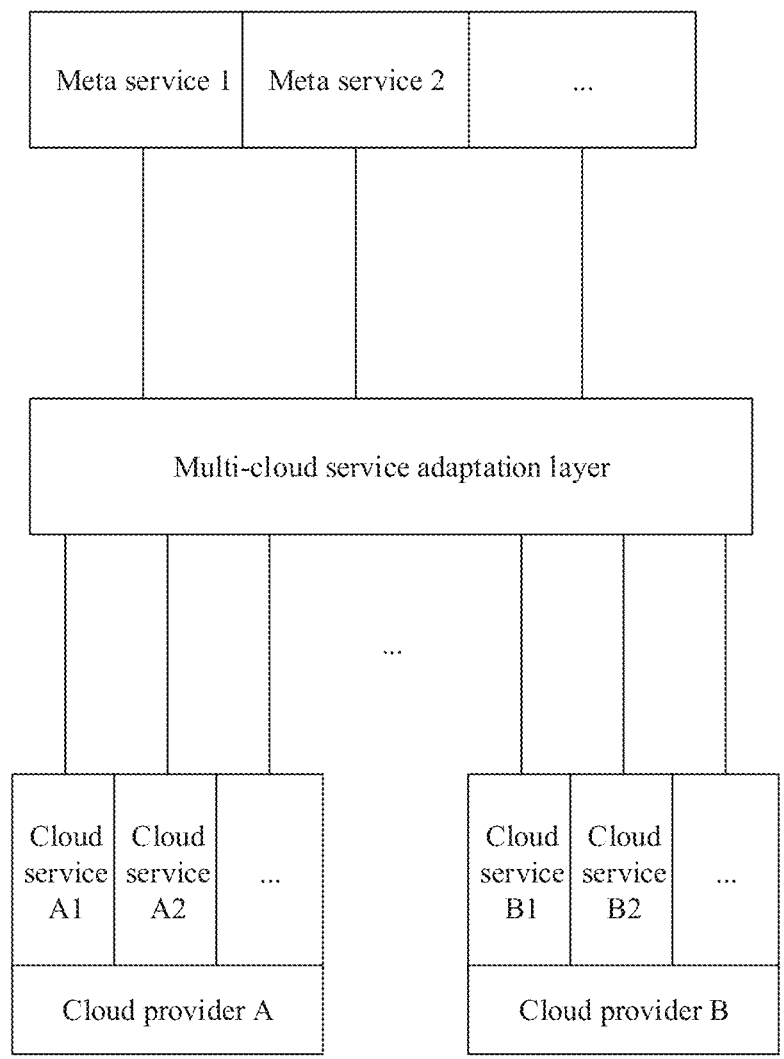
FIG. 3 is a schematic diagram of an application scenario of a data processing method according to an embodiment of this application.

An application scenario of the data processing method provided in accordance with the present disclosure is shown in FIG. 3.

A meta service is a service provided for a user, such as elastic cloud compute host management and object storage management. The meta service may be deployed on a network device, and the network device is used as a carrier to provide the meta service for the user. The network device may be a terminal, a server, or the like.

A cloud service is provided by a cloud provider through a cloud service device. The cloud provider may provide one or more cloud services. The cloud service is a service provided by the cloud provider to the meta service through a wireless or wired network. The meta service may use an invocation result of a corresponding cloud service as a service response, or the meta service may use an integrated invocation result of the cloud service as the service response, or the like. For example, in an actual scenario, a meta service provider provides a meta service A, and the meta service A is a service provided based on an invocation result of a cloud service B. The cloud service B is provided by the cloud provider through the cloud service device. When the meta service A is invoked, the meta service A requests to invoke the cloud service B through a multi-cloud service adaptation layer, to obtain an invocation result of invoking the cloud service B. Then, invocation of the provided meta service A is completed.

In one implementation, adding a multi-cloud management server is equivalent to adding the multi-cloud service adaptation layer in FIG. 3. The multi-cloud service adaptation layer uses one or more multi-cloud management servers as a carrier or carriers, and a function of the multi-cloud service adaptation layer is implemented by the one or more multi-cloud management servers.

The multi-cloud management server is mainly configured to implement metadata configuration of the meta service and the cloud service, conversion between a service request and a cloud service request packet, conversion between a cloud service response packet and a service response, and the like. Metadata of the meta service is a data structure corresponding to a parameter of the meta service and data, corresponding to the meta service, in the data structure. Metadata of the cloud service is a data structure corresponding to a parameter of the cloud service and data, corresponding to the cloud service, in the data structure. To reduce a workload of adapting the meta service and the cloud service when the cloud service is introduced, each time a cloud service is introduced, metadata is configured for the cloud service.

For example, the metadata of the meta service may include but is not limited to data such as an invocation parameter, a service address, and a service response of the meta service. The metadata of the cloud service may include data such as a service address of the cloud service, a quantity of invoked parameters, a type of invoked parameter, and a response packet.

Subsequent invocation of the meta service is performed based on the metadata of the meta service and the metadata of the cloud service. Some or all data included in the metadata of the meta service has a correspondence with some or all data included in the metadata of the cloud service. The multi-cloud management server may extract information in a service request based on the metadata of the meta service, and convert, based on the metadata of the cloud service, the information extracted from the service request into a request packet, to invoke the cloud service.

Further, example steps of invoking the cloud service may include:

The multi-cloud management server receives a service request of the meta service through the wireless or wired network. The service request is a request initiated by the network device to the multi-cloud management server for invoking the meta service. A format or a parameter of the service request matches the metadata of the meta service.

Then, the multi-cloud management server obtains, based on the metadata of the meta service, information carried in the service request. The multi-cloud management server performs data type conversion or sequence arrangement on the information in the service request based on a parameter type, an arrangement sequence, a parameter quantity, or the like corresponding to the data structure included in the metadata of the cloud service, to generate a request packet. The multi-cloud management server sends the request packet to the cloud service device through the wireless or wired network, to request to invoke a cloud service corresponding to the service request.

The multi-cloud management server receives, through the wireless or wired network, a response packet from the cloud service device. The response packet includes an invocation result obtained after the cloud service device invokes the corresponding cloud service based on information in the request packet after receiving the request packet. The multi-cloud management server obtains, based on the metadata of the cloud service, response information included in the response packet. In addition, the multi-cloud management server performs data type conversion or data arrangement on the response information based on the data structure included in the metadata of the meta service, and generates a service response based on a service response format included in the metadata of the meta service. The service response is a meta service response packet that matches the metadata of the meta service. The multi-cloud management server feeds back the service response to the network device that sends the service request, to complete invocation of the meta service.

In the data processing method provided in accordance with the present disclosure, the multi-cloud service adaptation layer uses the multi-cloud management server as a carrier, to reduce, through metadata configuration, an amount of code used for adapting the meta service and the cloud service when the cloud service is introduced. This reduces a workload of introducing the cloud service. The multi-cloud service adaptation layer defines metadata for each meta service, and defines metadata for each cloud service provided by each cloud provider. When a meta service is invoked, the defined metadata may be used for adaptation to invoke a cloud service corresponding to the meta service.

Therefore, the multi-cloud management server performs metadata configuration on a parameter, of the meta service, corresponding to the cloud service, and a parameter or information of the cloud service. The metadata of the cloud service and the metadata of the meta service are used to complete data conversion between the introduced cloud service and the corresponding meta service. A large amount of code is generated with an increasing quantity of introduced cloud services. Compared with a solution in which conversion and adaptation are performed on each introduced cloud service through code writing, code compilation and packaging, integration and deployment of the cloud service, and the like, the method provided in accordance with the present disclosure adapts the cloud service through metadata configuration. This can reduce the amount of code used for adapting the meta service and the cloud service when the cloud service is introduced, simplify a process of deploying the cloud service on the network device, and reduce the workload of introducing the cloud service. Further, in accordance with the present disclosure, specific implementations of steps such as metadata definition and cloud service invocation are further described in implementations corresponding to FIG. 4 and FIG. 5.

Figure 4:
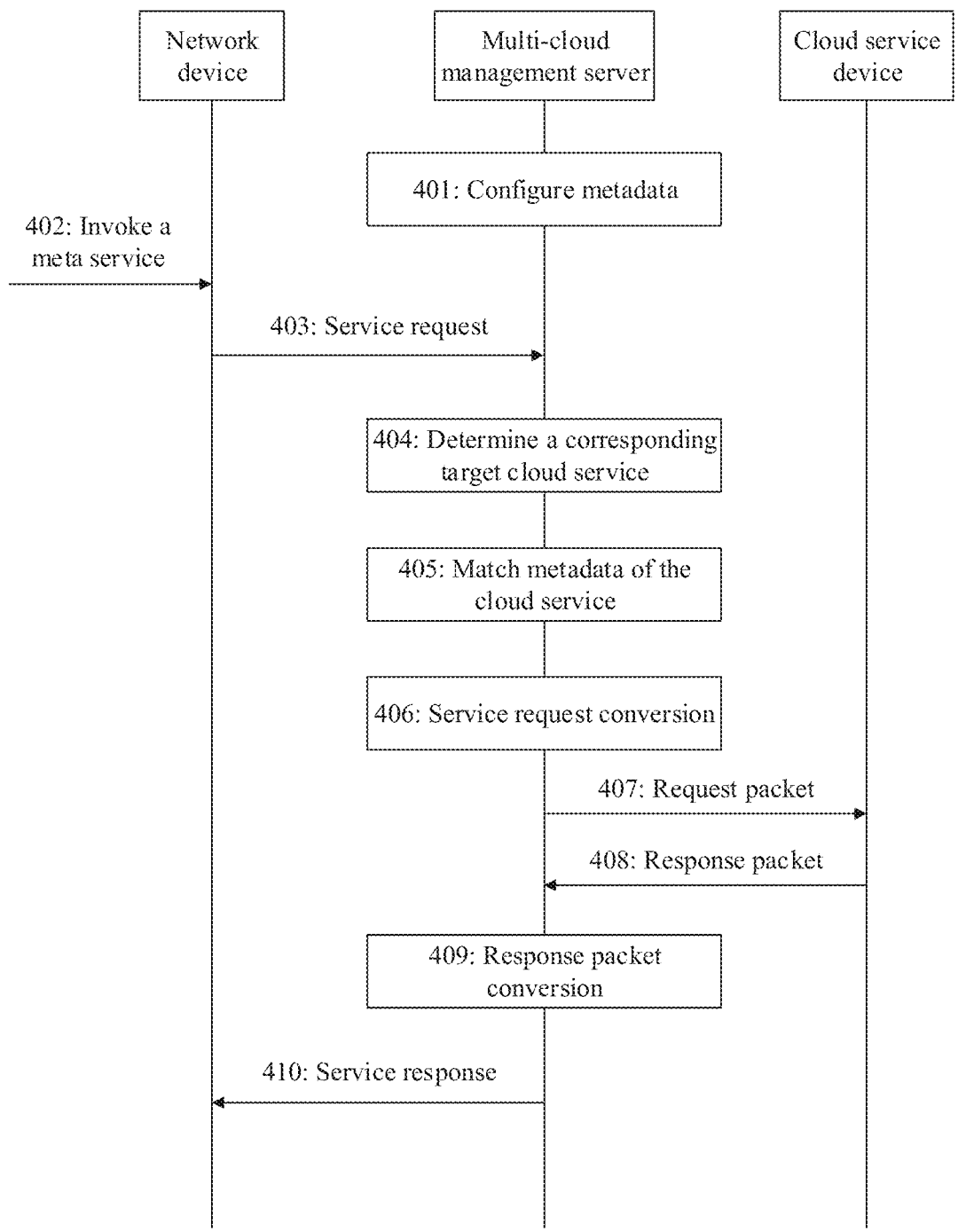
FIG. 4 is a schematic diagram of an embodiment of a data processing method according to an embodiment of this application.

First, FIG. 4 is a schematic flowchart of a data processing method according to this application. The method may include the following steps.

401: A multi-cloud management server configures metadata.

Before a meta service is invoked, to complete adaptation of an introduced cloud service and the meta service, the multi-cloud management server configures metadata, including configuring metadata of the meta service and metadata of the cloud service. The metadata of the meta service is data generated based on a first preset format by using related data of the meta service. The metadata of the cloud service is data generated based on a second preset format by using related data of the cloud service. There is a mapping relationship between data included in metadata of a meta service and data included in metadata of a corresponding cloud service.

Generally, the metadata is used as data that describes a data attribute. In this embodiment, metadata is configured for the related data of the meta service, to obtain a data structure corresponding to the related data and information of the meta service. In addition, metadata is configured for the related data and information of the cloud service, to obtain a data structure corresponding to the related data and the information of the cloud service. The metadata of the meta service and the metadata of the cloud service are stored in a memory or another storage medium of the multi-cloud management server.

First, configuring the metadata of the meta service may include: The multi-cloud management server determines a related parameter of the meta service. The related parameter includes a parameter, in a parameter of the meta service, corresponding to the corresponding cloud service, for example, a service parameter required for invoking the meta service, a service response obtained by invoking the meta service, or another related parameter of the meta service. Then, the multi-cloud management server determines a description of the related parameter in a preset manner. For example, the preset manner may be generating description manners for different parameters based on a parameter type, a parameter quantity, parameter content, or the like. Then, the multi-cloud management server combines or arranges, in a sequence, the description based on a hierarchical relationship, a use sequence, or the like of the parameter; generates the data structure, of the meta service, formed by the description of the related parameter; and fills the related parameter into the data structure, to obtain corresponding data in the data structure. In addition, in the data structure, each parameter corresponds to a description of each parameter. The data structure of the meta service and the data in the data structure form the metadata of the meta service.

Second, configuring the metadata of the cloud service may include: The multi-cloud management server first determines a related parameter or the information of the cloud service. The related parameter or the information includes but is not limited to a service name, a service address, an invocation manner, and the like of the cloud service. Then, the multi-cloud management server determines a description of each parameter or each piece of information in the related parameter or the information in a preset manner. For example, the preset manner may be generating description manners for different parameters based on a parameter type, a parameter quantity, parameter content, or the like. Then, the multi-cloud management server combines or arranges, in a sequence, the description based on a hierarchical relationship, a use sequence, or the like of the parameter; generates the data structure, of the cloud service, formed by the description of the related parameter or the information; and fills the related parameter or the information into the data structure, to obtain corresponding data in the data structure. In addition, in the data structure, each parameter corresponds to a description of each parameter. The data structure and the data in the data structure form the metadata of the cloud service.

If there is a mapping relationship between a meta service and a cloud service, there is a mapping relationship between a parameter included in metadata of the meta service and a parameter included in metadata of the cloud service, and the metadata of the meta service includes data corresponding to the cloud service. For example, if the metadata of the meta service includes an access parameter of the meta service, and a part of the access parameter corresponds to a request input parameter of the cloud service, the metadata of the cloud service includes the request input parameter, of the cloud service, corresponding to the part of the parameter.

Further, configuring the metadata of the cloud service may include: The multi-cloud management server first obtains a mapping relationship between the cloud service and a corresponding meta service. The mapping relationship is established by the multi-cloud management server and is stored in a local memory, a local storage medium, or the like. In addition, the multi-cloud management server obtains information such as an invocation manner, a service address, service orchestration, parameter mapping, or response mapping of the cloud service. Then, the multi-cloud management server determines, in a preset manner, a description of the mapping relationship between the cloud service and the corresponding meta service and a description of the information such as the invocation manner, the service address, the service orchestration, the parameter mapping, or the response mapping of the cloud service. For example, the preset manner includes describing based on a parameter type, a parameter quantity, a parameter function, or the like. The multi-cloud management server arranges, in a sequence, or combines the description of the information based on a type of a corresponding parameter, a hierarchical relationship, a reference relationship of the cloud service, and the like, to obtain a data structure corresponding to the cloud service. Then, the multi-cloud management server separately fills the mapping relationship, the invocation manner, the service address, the service orchestration, the parameter mapping, the response mapping of the cloud service, or the like into the data structure, to obtain corresponding data in the data structure. In the data structure, each parameter corresponds to a description of each parameter. The data structure of the cloud service and the corresponding data in the data structure are the metadata of the cloud service.

There is the mapping relationship between the meta service and the cloud service, and the mapping relationship is established by the multi-cloud management server. For example, the meta service is a translation service, the cloud service is a translation service provided by a cloud provider, and the meta service is a service provided based on the cloud service. The multi-cloud management server establishes the mapping relationship between the meta service and the cloud service, and stores the mapping relationship. When requesting to invoke the meta service, the multi-cloud management server may invoke the cloud service that has the mapping relationship, to obtain a service response of the meta service, namely, a meta service response packet that matches the metadata of the meta service.

It should be understood that if there is the mapping relationship between the meta service and the cloud service, there is a mapping relationship between data defined in the metadata of the meta service and data defined in the metadata of the cloud service. For example, if both the meta service and the cloud service are navigation services, there is the mapping relationship between the meta service and the cloud service, and a request input parameter in the metadata of the meta service defines a start point and an end point, the request input parameter in the metadata of the cloud service may also include a corresponding start point and a corresponding end point.

The invocation manner includes but is not limited to: invoking through a software development kit (SDK), RESTful invocation, or the like.

The service address is an address of the cloud service. When invoking the meta service, the multi-cloud management server may send a request packet to the cloud service based on the address of the cloud service, to invoke the cloud service.

The service orchestration is a description of orchestrating each API of each cloud service. Orchestration of the cloud service may include but is not limited to: arranging an invocation sequence of each API of the cloud service, or limiting an invocation relationship between APIs, or the like. For example, an invocation sequence of a first API and a second API of the cloud service may be arranged. The first API is arranged before the second API, such that when the API of the cloud service is invoked, the first API is first invoked, and then the second API is invoked. The invocation relationship between APIs may also be limited. When a service request includes an invocation parameter of the first API, the first API is first invoked to obtain an invocation result of invoking the first API. Then, the invocation result of the first API is used as an invocation parameter of the second API to invoke the second API.

The parameter mapping is a description of mapping of a parameter between the meta service and the cloud service. The parameter mapping is a manner of mapping parameter information of each API of the cloud service through metadata definition. For example, if metadata definition is performed on a service name, a request input parameter, and a service response of a corresponding meta service, the parameter mapping of the cloud service may include a parameter structure corresponding to the service name, the request input parameter, and the service response.

The response mapping is a description of response data obtained after the cloud service is invoked. Data corresponding to the response mapping may include the response data obtained by invoking the cloud service.

It should be understood that, the metadata of the cloud service may be defined in a scenario in which the cloud service is introduced, or the cloud service is maintained, or the like. Each time the cloud service is invoked, the metadata of the cloud service may not need to be defined again. In an actual application scenario, the metadata of the meta service may be first defined, or the metadata of the cloud service may be first defined, or the metadata of the meta service and the metadata of the cloud service may be defined at the same time. This may be further adjusted based on an actual scenario, and is not limited herein.

When a cloud service is introduced for a meta service for which metadata is configured, metadata of the introduced cloud service may be configured based on the metadata of the meta service. There is a mapping relationship between data included in the metadata of the introduced cloud service and data included in the metadata of the meta service. In implementation, when the cloud service is introduced for the meta service for which the metadata is configured, if the cloud service includes a parameter that does not correspond to the metadata of the meta service, the metadata of the meta service may be configured. The parameter that does not correspond to the metadata of the meta service is added to the metadata of the meta service based on a format corresponding to the metadata, and the metadata of the cloud service is configured.

Therefore, in this implementation, the metadata of the meta service and the metadata of the cloud service are configured. The metadata of the meta service and the metadata of the cloud service are used to implement data conversion between the meta service and the cloud service. Compared with a solution in which one-by-one code matching is performed on introduced cloud services to the meta service, this implementation reduces an amount of code used for adapting the cloud service and the meta service, and reduces a workload of adapting the cloud service and the meta service. In addition, metadata configuration is used to replace code customization. This reduces an amount of code. Subsequently, the metadata may be managed and maintained. This can reduce a workload of maintaining the cloud service later.

402: Invoke a meta service.

When the meta service is invoked, the meta service may be requested to be invoked through a network device. The meta service is a service provided for a user. The meta service may be a service such as creating an elastic meta server, translation, or navigation.

For example, the meta service is deployed on the network device. One or more meta services may be deployed on one network device. The user may select a to-be-invoked meta service on the network device, enter a parameter corresponding to the meta service, and then start to invoke the meta service by sending a start command or clicking a start button.

403: The network device sends a service request to the multi-cloud management server.

After determining to request to invoke the meta service, the network device generates the service request based on a parameter and metadata of the invoked meta service, and sends the service request to the multi-cloud management server through a wireless network, a wired network, or the like.

The service request may include information of the meta service, a related service parameter of the meta service, and the like. The service parameter in the service request matches the defined metadata of the meta service. The service parameter is generated by using an entered parameter by the network device based on a parameter type, a parameter format, and the like that are defined by the metadata of the meta service.

404: The multi-cloud management server determines a corresponding target cloud service.

After receiving the service request, the multi-cloud management server parses the service request. The multi-cloud management server determines one or more target cloud services based on a service parameter, a request indication, a preset mapping relationship, or the like in the service request. "A plurality of" means two or more. It should be understood that the target cloud service in accordance with the present disclosure is a cloud service corresponding to the meta service.

For example, the service request includes information such as a service provider and a region. The multi-cloud management server determines the corresponding target cloud service based on the information such as the service provider and the region in the service request.

405: The multi-cloud management server matches the metadata of the cloud service.

After the one or more target cloud services corresponding to the service request are determined, the metadata of the cloud service is matched with the information carried in the service request. Then, a first packet structure, in the metadata of the cloud service, corresponding to the information carried in the service request is obtained based on the information carried in the service request and the metadata of the cloud service. The first packet structure includes an arrangement format, an arrangement sequence, an expression manner, and the like of a parameter, in the metadata of the cloud service, corresponding to a parameter in the service request.

If there are a plurality of target cloud services, the service parameter in the service request needs to be matched with metadata of the plurality of target cloud services, to obtain a first packet structure, in metadata of each target cloud service, corresponding to the parameter in the service request.

The first packet structure may be used to convert a service request of the meta service and a cloud service request packet, to complete invocation of the cloud service. Therefore, in this embodiment, the service parameter in the service request may be matched with the metadata of the cloud service, to obtain the first packet structure, so as to complete, between the meta service and the cloud service, conversion between the service request of the meta service and the cloud service request packet when the meta service is invoked. This can overcome an invocation difference between cloud services. Compared with a solution in which one-by-one code customization is performed on each cloud service, this embodiment can implement lightweight adaptation of the meta service and the cloud service, shield the invocation difference, and reduce the workload of adapting the cloud service.

406: The multi-cloud management server converts the service request.

After the service parameter in the service request is matched with the metadata of the one or more target cloud services to obtain the first packet structure, the multi-cloud management server converts the service request, and converts, based on the first packet structure, the service request into a request packet corresponding to the target cloud service, namely, the cloud service request packet. If the service request corresponds to the plurality of target cloud services, the service request may be converted, based on the metadata of each target cloud service, into a plurality of request packets respectively corresponding to the target cloud services.

Further, a step of converting the service request may be: After the parameter in the service request is matched with the metadata of the cloud service to obtain the first packet structure, in the metadata of the cloud service, corresponding to the parameter in the service request, the multi-cloud management server obtains the service parameter in the service request based on the metadata of the meta service, and performs data type conversion, parameter sequence adjustment, or the like based on a data type or the arrangement sequence included in the first packet structure, to generate the request packet.

It should be understood that the request packet in accordance with the present disclosure is the cloud service request packet corresponding to the cloud service.

In this embodiment, the service request may be matched with the metadata of the cloud service, to convert the service request into the request packet corresponding to the target cloud service. This can overcome an invocation difference between different cloud service request packets. Compared with a solution in which code adaptation is performed on each introduced cloud service, the data processing method provided in accordance with the present disclosure can certainly improve efficiency of adapting the meta service and the cloud service, and reduce a workload of adapting the introduced cloud service.

407: The multi-cloud management server sends the request packet to a cloud service device.

The multi-cloud management server sends one or more request packets to a corresponding cloud service device through the wireless network, the wired network, or the like, to invoke the one or more target cloud services.

Before sending the request packet, and after determining the target cloud service and an address of the target cloud service, the multi-cloud management server further performs parameter mapping based on the parameter in the service request and the metadata of the cloud service. Further, the multi-cloud management server may compare the parameter in the service request with the metadata of the cloud service, and determine one or more cloud service APIs, of the target cloud service, corresponding to the information carried in the service request. Then, the multi-cloud management server sends a converted request packet to the one or more cloud service APIs, to invoke the one or more cloud service APIs.

In implementation, each cloud service may have a plurality of different APIs, and not all APIs correspond to the service request. Therefore, the multi-cloud management server may further perform parameter mapping based on the parameter in the service request and the metadata of the target cloud service, to determine a specific API corresponding to the service request, so as to invoke the corresponding API. This improves reliability of adapting the cloud service and the meta service.

408: The cloud service device sends a response packet to the multi-cloud management server.

After receiving the request packet from the multi-cloud management server, the cloud service device invokes one or more corresponding target cloud services or one or more APIs of the target cloud service based on the request packet, to obtain an invocation result. Then, the cloud service device generates the response packet, and the response packet includes the invocation result. A parameter included in the response packet matches the metadata of the cloud service.

It should be understood that the response packet in accordance with the present disclosure is the cloud service response packet corresponding to the cloud service.

The cloud service device sends the response packet to the multi-cloud management server. If the multi-cloud management server sends the request packet to a plurality of cloud service devices, each of the plurality of cloud service devices invokes a corresponding cloud service to obtain an invocation result and generate a response packet. Then, the plurality of cloud service devices send a plurality of response packets to the multi-cloud management server. In addition, a parameter included in each of the plurality of response packets matches metadata of the corresponding cloud service.

409: The multi-cloud management server converts the response packet.

After receiving one or more response packets from the cloud service device, because formats, parameter types, other information, or the like of response packets generated for cloud service devices may be different, the multi-cloud management server needs to convert the received response packet into a service response in a preset format, namely, a meta service response packet that matches the metadata of the meta service, such that the network device may obtain, based on the service response, an invocation result of invoking the cloud service.

An example manner of converting the response packet may include: Response data in the response packet is matched with data in the service response defined in the metadata of the meta service, to obtain a second packet structure corresponding to the response data in the response packet and the service response in the metadata of the meta service. Then, the multi-cloud management server performs, based on the second packet structure, rearrangement, data type conversion, and the like on the response data included in the response packet, to obtain the service response corresponding to the meta service. The service response includes response data included in the one or more response packets.

In this embodiment, the response data in the response packet is matched with the metadata of the meta service, to obtain the second packet structure corresponding to the meta service response packet. Then, the multi-cloud management server converts the response packet based on the second packet structure, to obtain the service response corresponding to the meta service. The multi-cloud management server adapts the cloud service response packet and the service response of the meta service between the meta service and the cloud service. This allows a format difference between different cloud service response packets, to implement conversion of response packets in different arrangement formats. In addition, compared with a solution in which one-by-one code customization and development are performed on the introduced cloud service, in this embodiment, data conversion between the meta service and the cloud service is performed through metadata configuration. This reduces a workload of adapting the service response.

410: The multi-cloud management server sends the service response to the network device.

After the multi-cloud management server converts the response packet to obtain the service response, namely, the meta service response packet matching the metadata of the meta service, the multi-cloud management server sends the service response to the network device. After receiving the service response, the network device may parse the service response to obtain service data in the response.

If the network device is a terminal device, for example, a mobile phone or a tablet computer, the data obtained by parsing the service response may be directly displayed on the terminal device.

In this embodiment, the multi-cloud management server may adapt the service request for invoking the cloud service by the network device, to determine a corresponding cloud service, and convert the service request into the request packet that matches the metadata of the cloud service. The metadata of the meta service is configured by the multi-cloud management server. Then, the multi-cloud management server sends the request packet to the corresponding cloud service device, and invokes the cloud service corresponding to the service request or a specific application of the cloud service.

Therefore, in this embodiment, the metadata of the meta service and the metadata of the cloud service are used to complete data conversion between the meta service and the cloud service, to complete adaptation of the meta service and the cloud service. When a new cloud service is introduced, only metadata definition, request conversion, response conversion, and the like need to be performed on the cloud service, such that the multi-cloud management server adapts the meta service and the cloud service. This allows an invocation difference of the cloud service, reduces an amount of code used for adapting the meta service and the cloud service, and reduces a workload of adapting the meta service and the cloud service.

Figure 5:
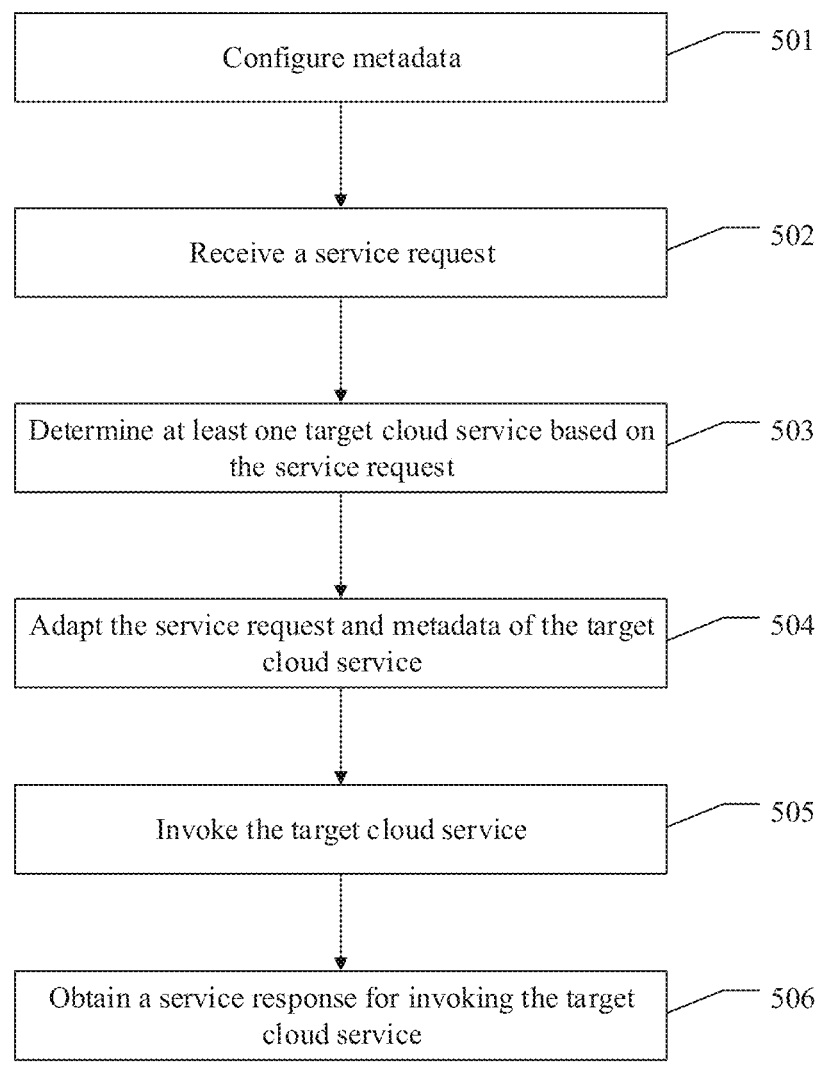
FIG. 5 and FIG. 5A are schematic diagrams of embodiments of a multi-cloud management server side in a data processing method according to an embodiments of this application.

The foregoing describes an example procedure of the data processing method provided in accordance with the present disclosure. The following further describes a step performed by a multi-cloud management server in the data processing method provided in the embodiments of this application. FIG. 5 is a schematic diagram of another embodiment of a data processing method according to an embodiment of this application. The method may include the following steps.

501: Configure metadata.

First, the multi-cloud management server configures metadata, including metadata of a meta service and metadata of a cloud service. Metadata configuration in this embodiment is similar to the step of configuring the metadata of the meta service and the metadata of the cloud service in step 401. Details are not described herein again. The following describes the metadata configuration as an example.

For example, if the meta service is a navigation service provided for a user, an input parameter includes but is not limited to a start position, a destination position, a route selection condition, a travel manner, or the like. The route selection condition may be a shortest time period, a shortest-distance route, a shortest walking time period, or the like. The travel manner may be a bus, a subway, self-driving, walking, or the like. A plurality of input parameters may be defined as a request input parameter, and the request input parameter includes a plurality of parameter definitions. A service response is a meta service response packet that matches the metadata of the meta service. The meta service response packet includes a service response obtained by invoking the meta service, including route information, a route mileage, and the like. The route information includes a node passed through, a direction, and the like in a route included in the route information. The route mileage is a distance of the route. As shown in Table 1:

TABLE 1

| Service name | Navigation service |
|---|---|
| Request input parameter | Start address |
| | Destination address |
| | Route selection condition |
| | Travel manner |
| Service response | Route information |
| | Route mileage |
| | . . . |

In Table 1, the metadata of the meta service includes the service name, the request input parameter, and the service response that are of the meta service. The service name includes a name of the meta service, the request input parameter includes the input parameter of the meta service, and the service response includes data obtained by invoking the meta service.

The cloud service is a map service. The meta service is a service provided based on an invocation result of the cloud service, and the meta service uses the invocation result of the cloud service as the service response or some data in the service response. There is a mapping relationship between the cloud service and the meta service, and the mapping relationship is determined by the multi-cloud management server when the cloud service is introduced. Configuring the metadata of the cloud service mainly includes: The multi-cloud management server determines related data of the cloud service. The related data may include but is not limited to a service address, a request input parameter, information included in a response packet, and the like. Then, the multi-cloud management server arranges and names the related data of the cloud service in a preset manner, to obtain the metadata of the cloud service.

An example manner of configuring the metadata of the cloud service is shown in Table 2.

TABLE 2

| Mapping service | Navigation service |
|---|---|
| Mapping manner | SDK invocation |
| Service address | ditu.com |
| Service orchestration | 1. Route query API |
| | 2. Condition-based filtering API |
| Request input parameter | Route query. Latitude and longitude of a start address |
| | Route query. Latitude and longitude of a destination address |
| | Condition-based filtering. Route selection condition |
| | Condition-based filtering. Travel manner |
| Response mapping | Route information |
| | Route mileage |
| | Time period required for a route |
| | . . . |

Table 2 shows the metadata configured for the cloud service. The metadata of the cloud service includes but is not limited to the mapping service, the mapping manner, the service address, the service orchestration, the request input parameter, the response mapping, and the like that are of the cloud service. The mapping service is a meta service that has a mapping relationship with the cloud service. One meta service may have a mapping relationship with a plurality of cloud services, and one cloud service may also be mapped to a plurality of meta services. The mapping manner is an invocation manner used to invoke the cloud service. The service address is an address of the cloud service. The service orchestration is to arrange or convert an API of the cloud service. The request input parameter is a request parameter of the API of the cloud service. The response mapping includes the invocation result obtained by invoking the cloud service.

A data form in which the multi-cloud management server configures the metadata of the meta service or the cloud service may be an JavaScript object notation (JSON), an extensible markup language (XML), a data table, or the like. Herein, only the data table is used as an example for description. This may be further adjusted based on an actual scenario, and is not limited herein.

In one implementation, the multi-cloud management server configures the metadata of the meta service and the metadata of the cloud service. The metadata of the meta service and the metadata of the cloud service may be used to implement data conversion between the meta service and the cloud service, to implement adaptation of the cloud service and the meta service when the cloud service is introduced. This can reduce an amount of code and a workload that are required for independent code adaptation of the cloud service. This can avoid problems such as a long development period and a large amount of customized code that are caused by one-by-one customization and adaptation, and improve efficiency of adapting the meta service and the cloud service. In addition, in accordance with the present disclosure, adaptation of the cloud service is completed through the metadata configuration, and the metadata of the cloud service may be maintained during subsequent maintenance. In addition, code for adapting the meta service and the cloud service is reduced, and code maintenance is reduced. Therefore, a workload of maintaining the cloud service later can be reduced.

502: Receive a service request.

First, the multi-cloud management server receives the service request from a network device. The service request is used to request to invoke a meta service provided by the network device. The network device may send the service request through a wireless network, a wired network, or the like. The service request includes a service name, a service parameter, a service address, or the like corresponding to the meta service requested to be invoked, and a parameter included in the service request matches metadata of the meta service.

For example, if the meta service is the navigation service, defined metadata is shown in Table 1. The service request may include but is not limited to parameters such as the service name (the navigation service), the start address, the destination address, the route selection condition, and the travel manner. All or some of the parameters may be entered by the user, and match a parameter included in the metadata of the meta service.

For another example, if the network device is a terminal device, the terminal device may be a mobile phone, a tablet computer, a desktop computer, or the like. The terminal device provides a translation service. Metadata configured for the translation service may include a to-be-translated sentence, an original language type, and a target language type. When the user needs to use the translation service, the user may enter a type of a to-be-translated language, a to-be-translated target sentence, and the like on a terminal. Then the user clicks a "Translate" button to invoke the translation service to translate the to-be-translated target sentence. If the user requests to translate a Chinese sentence into an English sentence, the network device may generate the service request based on the metadata. In this case, in the service request, the to-be-translated sentence is a Chinese original sentence, the original language type is Chinese, and the target language type is English. In addition, the parameter included in the service request matches the metadata of the translation service.

It should be noted that, before receiving the service request, the multi-cloud management server has configured the metadata, and the metadata may not need to be configured each time before the service request is received. The metadata may be configured when the metadata is maintained or adjusted. This may be further adjusted based on an actual scenario.

503: Determine at least one target cloud service based on the service request.

The service request carries information of the meta service requested to be invoked. The parameter included in the service request matches the metadata of the meta service. The multi-cloud management server may match the service request through the metadata of the meta service, to obtain information carried in the service request. Then, the multi-cloud management server may determine, based on one or more of related service parameters, one or more target cloud services corresponding to the service request. Alternatively, the multi-cloud management server may search the one or more corresponding target cloud services based on the mapping relationship, of the meta service, determined by the multi-cloud management server. It should be understood that the target cloud service in accordance with the present disclosure is the cloud service corresponding to the meta service.

In implementation, for determining the one or more corresponding target cloud services based on the service request by the multi-cloud management server, the multi-cloud management server may search through the parameter in the service request, or may search in a search manner preset on the multi-cloud management server, or may search based on the mapping relationship established by the multi-cloud management server. This may be further adjusted based on an actual scenario, and is not limited herein. For example, a cloud service that is closest to the network device, a cloud service that has a minimum quantity of transmission nodes, or a cloud service that is provided by an idle cloud service device may be determined as the target cloud service. For another example, when an elastic cloud server of the multi-cloud management server is requested to be managed, the multi-cloud manager identifies, based on the parameter in the service request, a cloud provider that provides the elastic cloud server, to obtain and invoke an API address, provided by the cloud provider, corresponding to the elastic cloud server.

For example, the meta service is an image recognition service. When text in an image needs to be recognized, an image recognition process is relatively complex. Therefore, to improve image recognition efficiency and transmission efficiency, the multi-cloud management server may query a cloud service device closest to the network device, and determine an address of the closest cloud service device, to reduce a network delay and improve the image recognition efficiency and the transmission efficiency.

504: Adapt the service request and metadata of the target cloud service.

After determining the one or more target cloud services corresponding to the service request, the multi-cloud management server adapts the service request based on the metadata of the meta service, to obtain the information carried in the service request. Then, the multi-cloud management server maps the information carried in the service request to the metadata of the cloud service, to obtain a first packet structure, in the metadata of the cloud service, corresponding to the information carried in the service request. The service request is converted into a request packet based on the first packet structure. The first packet structure includes an arrangement format and an expression format, in the metadata of the cloud service, corresponding to the information carried in the service request.

An example process of mapping the information carried in the service request to the metadata of the cloud service may include: obtaining the information carried in the service request; comparing the information carried in the service request with the metadata of the corresponding cloud service, to determine a location of a parameter, in the metadata of the cloud service, of the information carried in the service request; then, determining a mapping relationship between the parameter and the metadata of the cloud service based on the location of the parameter, and generating the first packet structure corresponding to the parameter and the metadata of the cloud service based on the mapping relationship.

It should be understood that if the multi-cloud management server determines that there are a plurality of target cloud services, the multi-cloud management server maps the information carried in the service request to metadata of each cloud service, to obtain a first packet structure corresponding to each cloud service. Then, the multi-cloud management server converts, based on the first packet structure corresponding to each cloud service, the service request into a request packet that is in a one-to-one correspondence with each cloud service.

After the multi-cloud management server determines the one or more corresponding target cloud services, because there may be a plurality of different APIs of the target cloud service, and access parameters of the APIs are different in a parameter type, a parameter quantity, or the like, parameters that match the APIs may also be different. Therefore, the information carried in the service request and the metadata of the cloud service need to be adapted, to determine a specific API, corresponding to the service request, of the target cloud service.

An example process in which the multi-cloud management server adapts the metadata of the cloud service and the information carried in the service request may be: performing parameter mapping between the information carried in the service request and a parameter defined in the metadata of the cloud service, to obtain the first packet structure corresponding to the parameter in the service request and a parameter that matches the API. Then, the multi-cloud management server obtains, by combining the service parameter carried in the service request with the first packet structure, the request packet including a parameter for invoking the API. The first packet structure includes the arrangement format and the expression format, in the metadata of the cloud service, corresponding to the information carried in the service request.

For example, an example conversion manner of the service request may be that the service request includes a parameter type A, a parameter type B, and a parameter type C. It is determined that cloud services corresponding to the service request are a cloud service A and a cloud service B, API interface input parameters of the cloud service A are the parameter type A and the parameter type C, and API interface input parameters of the cloud service B are the parameter type B and the parameter type C. In this case, the service request needs to be converted into a request packet corresponding to the API input parameter of the cloud service A and a request packet corresponding to the API input parameter of the cloud service B. The request packet, obtained after conversion, corresponding to the cloud service A includes the parameter type A and the parameter type C, and the request packet corresponding to the cloud service B includes the parameter type B and the parameter type C. Alternatively, if the API input parameters of the cloud service A are the parameter type A and a parameter type D, the parameter type B or the parameter type C in the service request may be converted into the parameter type D. The request packet obtained after conversion includes the parameter type A, the parameter type D obtained by converting the parameter type B or the parameter type C, and the like.

For example, the meta service corresponding to Table 1 in step 501 is used as an example. The meta service is the navigation service, and there is a mapping relationship between the meta service and a cloud service. Metadata of the cloud service is shown in Table 2 in step 501. The service request may include but is not limited to the parameters or information such as the service name (the navigation service), the start address, the destination address, the route selection condition, and the travel manner. A parameter type, a parameter format, and the like that are of the service request correspond to the metadata of the meta service. The multi-cloud management server maps the parameter in the service request to the metadata of the cloud service in Table 2, and determines a parameter location, in Table 2, corresponding to the parameter in the service request. In other words, the parameter is distributed in the request input parameter in Table 2. Then, the multi-cloud management server determines a corresponding mapping relationship between the parameter location and the parameter in the service request. The mapping relationship is "Route query. Latitude and longitude of a start address", "Route query. Latitude and longitude of a destination address", "Condition-based filtering. Route selection condition", and "Condition-based filtering. Travel manner". Then, the multi-cloud management server determines a first packet structure of the request packet based on the distribution manner or the arrangement manner. The first packet structure is "Route query. Latitude and longitude of a start address", "Route query. Latitude and longitude of a destination address", "Condition-based filtering. Route selection condition", and "Condition-based filtering. Travel manner".

Then, the multi-cloud management server generates a corresponding request packet based on the first packet structure. The request packet is "Route query. Latitude and longitude of a start address", "Route query. Latitude and longitude of a destination address", "Condition-based filtering. Route selection condition", and "Condition-based filtering. Travel manner". The request packet includes the service name (the navigation service), the start address, the destination address, the route selection condition, the travel manner, and the like that are carried in the service request. In the metadata of the cloud service, latitude and longitude are used to query a start address and a destination address of a route. Therefore, both a start address and a destination address in the first packet structure are longitude and latitude. The information carried in the service request is a text description of an address. Therefore, the start address and the destination address carried in the service request need to be converted into longitude and latitude, to generate a request packet corresponding to the metadata of the cloud service. In addition to the longitude and latitude, if the information carried in the service request does not match an information parameter type or an information parameter format defined in the metadata of the cloud service, a parameter type or a parameter quantity in the information carried in the service request may be converted into a parameter or data that matches the metadata of the cloud service.

Therefore, in accordance with the present disclosure, the information carried in the service request and the metadata of the cloud service may be adapted, to complete conversion of the service request and obtain the request packet corresponding to the cloud service. This can overcome invocation differences between different cloud services. The conversion of the service request can be completed through metadata matching. This can reduce workload of adapting each cloud service and each meta service when the cloud service is introduced, and implement lightweight adaptation of the meta service and the cloud service.

505: Invoke the target cloud service.

After generating a request packet, the multi-cloud management server sends the request packet to at least one cloud service device that provides a corresponding target cloud service, to invoke the target cloud service corresponding to the request packet. The request packet includes some or all parameters in the service request from the network device, a parameter obtained after the multi-cloud management server converts a parameter type of the parameter in the service request, or the like. The request packet corresponds to a format, an arrangement sequence, and the like of the metadata of the cloud service. Therefore, the cloud service device may obtain information carried in the request packet, determine the cloud service or an API of the cloud service requested to be invoked by the request packet, and invoke the cloud service or the API of the cloud service to obtain a response packet.

Generally, the cloud service may include a plurality of APIs, and a specific API to be invoked may be determined based on a service parameter in the service request. The multi-cloud management server may perform parameter mapping between the service parameter in the service request and the metadata of the target cloud service, to determine an address of an API, corresponding to the service request, of the target cloud service. Then, the multi-cloud management server sends the request packet to the cloud service device, to invoke the API corresponding to the service request, so as to invoke the target cloud service.

506: Obtain a service response for invoking the target cloud service.

After invoking the target cloud service, the cloud service device sends, to the multi-cloud management server through the response packet, an invocation result of invoking the target cloud service. After receiving the response packet of the cloud service, the multi-cloud management server obtains, based on the metadata of the cloud service, information carried in the response packet, and converts, based on the metadata of the meta service, the information carried in the response packet into the service response, namely, the meta service response packet that matches the metadata of the meta service.

Further, the multi-cloud management server may extract the information in the response packet based on a structure of the response packet included in the metadata of the cloud service. Then, the multi-cloud management server determines, based on the metadata of the meta service, a second packet structure for converting the response packet, and performs, based on the second packet structure, data type conversion, arrangement, and the like on the information carried in the response packet, to generate the service response, namely, the meta service response packet that matches the metadata of the meta service, such that the network device may obtain, based on the service response, the invocation result of invoking the cloud service.

Further, the step of determining the second packet structure by the multi-cloud management server may be: The multi-cloud management server extracts, based on the metadata of the cloud service, the information carried in the response packet, and searches, in the metadata of the meta service, a parameter location corresponding to the information carried in the response packet. Then, the multi-cloud management server may obtain the second packet structure, in the metadata, corresponding to the parameter location.

In actual application, the multi-cloud management server needs to integrate one or more received response packets to extract required information. Then, the multi-cloud management server processes the required information based on the metadata of the meta service, and converts the information into a service response in a unified format, namely, the meta service response packet. This can implement conversion between a cloud service response packet and the service response of the meta service, such that the network device obtains an available service response after invoking the meta service. Further, this can reduce an amount of code used for adapting response packets of different cloud services, and reduce a workload of adapting the meta service and one or more cloud services when the cloud service is introduced.

Figure 5A:
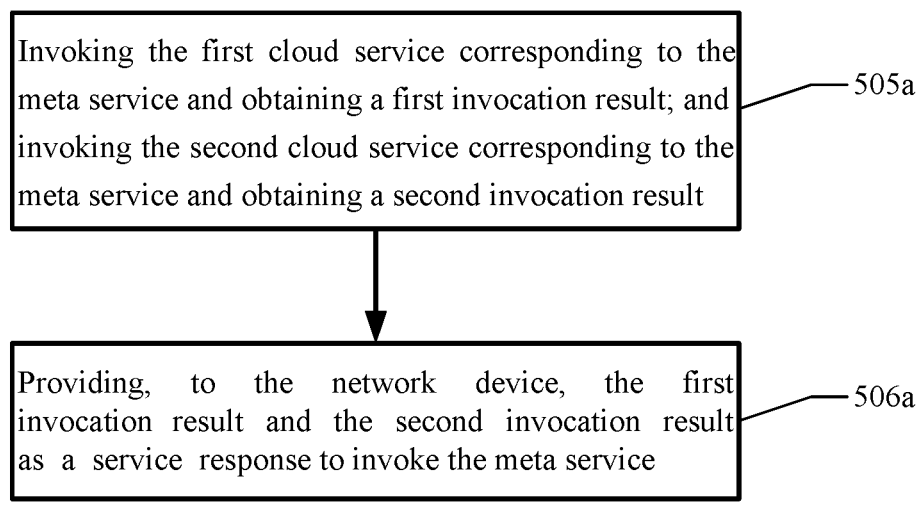

In addition, if a plurality of cloud services have a mutual invocation relationship, a response packet obtained first by invoking a cloud service may be converted and then sent to a cloud service that is executed later, to obtain a complete response result. For example, when a meta service A is invoked, a cloud service 1 and a cloud service 2 need to be invoked (see, e.g., FIG. 5A, step 505a). First, the multi-cloud management server receives a response packet 1 of the cloud service 1, and the multi-cloud management server extracts and converts data in the response packet 1 to obtain a request packet corresponding to the cloud service 2. Then, the multi-cloud management server sends the request packet to a cloud service device 2, to invoke the cloud service 2. The cloud service device 2 sends the response packet 2 of the cloud service 2 to the multi-cloud management server. After receiving the response packet 2, the multi-cloud management server may convert the response packet 2 to obtain a service response, or may convert the response packet 1 and the response packet 2 to obtain the service response (see, e.g., FIG. 5A, step 506a). This is further adjusted based on an actual design requirement.

Conversion of the response packet may be implemented based on the metadata of the meta service. The received cloud service response packet is converted into a service response in a preset format, namely, the meta service response packet. Further, if there are response packets of a plurality of cloud services, the multi-cloud management server may process the response packets of the plurality of cloud services, including removing repeated content, selecting the best content from the repeated content, or combining the repeated content, or the like, to obtain a final feedback result. Then, the multi-cloud management server converts the feedback result based on a format included in the metadata of the meta service, and converts the feedback result into a service response that matches the metadata of the meta service. If there is only one response packet, information carried in the response packet may be directly obtained, and the service response is generated, based on a response format included in the metadata of the meta service, by using the information carried in the response packet.

An example process of converting the response packet into the service response may comprise: The multi-cloud management server matches a parameter and a format of the response packet with the metadata of the cloud service, and extract the information carried in the response packet based on the format, of the response packet, defined in the metadata of the cloud service. Then, the information carried in the response packet is compared with the metadata of the meta service, to determine a parameter location, in the metadata of the meta service, corresponding to the information carried in the response packet. Then, a mapping relationship between the information carried in the response packet and the metadata of the meta service is determined based on the parameter location. A second packet structure of the service response is generated based on the mapping relationship, and the service response is obtained based on the second packet structure and the information carried in the response packet.

For example, that the meta service is the translation service is used as an example to describe the conversion of the response packet. After receiving a request packet for invoking the translation service, the multi-cloud management server determines, based on the request packet and the metadata of the translation service, that the to-be-translated sentence is "how are you", the original language type is English, and the target language type of translation is Chinese. In addition, a speech of a translation result needs to be obtained. A translation result of a cloud translation service 1 is more accurate, but no speech conversion is provided. Compared with the translation result of the cloud translation service 1, a translation result of a cloud translation service 2 is inaccurate, but speech conversion is provided. Therefore, the multi-cloud management server converts the service request to obtain a service request 1 corresponding to the cloud translation service 1. A parameter of the service request 1 matches metadata of the cloud translation service 1, and the service request 1 includes the to-be-translated sentence "how are you" and a conversion indication for converting from English to Chinese.

After a cloud translation service end 1 receives the service request 1, translation is performed based on information carried in the service request 1, to obtain a translation result, and a response packet 1 is generated. Then, the response packet 1 is sent to the multi-cloud management server. After receiving the response packet 1, the multi-cloud management server determines the translation result is "how are you recently in Chinese" through the response packet 1. Then, the multi-cloud management server generates, by using the translation result and a speech conversion indication, a request packet 2 corresponding to the cloud translation service 2. A parameter of the request packet 2 matches metadata of the cloud translation service 2. The request packet 2 includes a to-be-converted sentence "how are you recently" and the speech conversion indication, and then the request packet 2 is sent to a cloud translation service end 2. After receiving the request packet 2, the cloud translation service end 2 converts the to-be-converted sentence based on the to-be-converted sentence and the speech conversion indication in the request packet 2, to generate a response packet 2. The response packet 2 includes conversion data of the to-be-converted sentence. After receiving the response packet 2, the multi-cloud management server determines a conversion result of the to-be-converted sentence.

The multi-cloud management server generates a service response, namely, a meta service response packet, based on data in the response packet 1 and data in the response packet 2. The service response may include the translation result "how are you recently" and a conversion result of the speech conversion. If the translation result does not need to be provided, and only the conversion result of the speech conversion needs to be provided, the multi-cloud management server generates a service response based on the data in the response packet 2 and a structure of a response packet included in the metadata of the meta service. The service response may include the conversion result of the speech conversion, and does not include the translation result "how are you recently".

For example, the meta service corresponds to Table 1 and the cloud service corresponds to Table 2 in step 501 are used as an example. A response packet obtained by invoking the cloud service includes the route information, the route mileage, the time period required for a route, and the like. Generally, an invocation result obtained by invoking the cloud service and data included in a service response of the meta service, namely, a meta service response packet differ in a parameter type, a parameter quantity, or the like. Therefore, the multi-cloud management server may map information carried in the response packet to metadata of the meta service, and determine an arrangement sequence, a format, or the like, in the metadata of the meta service, corresponding to the information carried in the response packet, to obtain a first packet structure of the service response. The first packet structure includes the route information and the route mileage. Then, the multi-cloud management server converts, based on the first packet structure, the information carried in the response packet, deletes the time required for the route in the response packet, and then obtains the service response based on a parameter and a sequence of the first packet structure. The service response includes the route information and the route mileage that are carried in the response packet. If the network device is a mobile phone, a tablet computer, or the like, the network device may obtain information such as the route information and the route mileage through the response packet, and then display the route information and the route mileage on a display interface.

Therefore, in this implementation, the multi-cloud management server configures the metadata of the meta service and the metadata of the cloud service, and converts data between the meta service and the cloud service based on the metadata of the meta service and the metadata of the cloud service. This ensures that the meta service can normally interact with the cloud service to obtain an accurate invocation result. In addition, in this embodiment, the metadata is configured, and the service request and the response packet are converted based on the metadata, to implement lightweight adaptation of the meta service and the cloud service. This overcomes an invocation difference between different cloud services. The meta service and the cloud service may be adapted by configuring the metadata of the meta service and the metadata of the cloud service, which requires a small amount of code. Compared with a solution in which one-by-one customization and development are performed on each introduced cloud service and an amount of code increases linearly, this application can reduce an amount of code used for adapting the meta service and the cloud service, and improve efficiency of introducing the cloud service.

A complete procedure of the data processing method provided in accordance with the present disclosure is described below by using a specific embodiment as an example.

A multi-cloud management system provides a meta service (create an elastic cloud server). A cloud provider A and a cloud provider B provide different cloud services (create an elastic cloud server).

First, metadata of the meta service (create an elastic cloud server) is defined. Defined metadata of a specific meta service is shown in Table 3.

TABLE 3

| Service name | Create an elastic cloud server |
|---|---|
| Request input parameter | Instance specification |
| | Disk specification |
| | Image name |
| | ... |
| Service name | Create an elastic cloud server |
| Service response | Instance ID |
| | Creation status |
| | ... |

Metadata is configured for a service name, a request input parameter, and data in a service response that are of the meta service. Further, a name of the meta service is "create an elastic cloud server". The request input parameter includes an instance specification, a disk specification, an image name, or the like. The service response may include an instance ID, a creation status, and the like.

The meta service is a service provided for a user. The request input parameter may be entered or provided by the user. A parameter in a subsequent request packet matches the request input parameter defined in the metadata in Table 3. The service response in Table 3 is an invocation result obtained by invoking the cloud service. Subsequently, when a response packet obtained by invoking the cloud service is converted, conversion may be performed based on the service response in Table 3.

The meta service is implemented based on a cloud service A and a cloud service B. In other words, the meta service is provided based on an invocation result of the cloud service A and an invocation result of the cloud service B. Therefore, the metadata of the meta service is configured, and metadata of the cloud service A needs to be configured. Further, the metadata configured for the cloud service A provided by the cloud provider A may be shown in Table 4.

TABLE 4

| Mapping service | Create an elastic cloud server |
|---|---|
| Mapping manner | SDK invocation |
| Provider | vender_a |
| Method mapping | com.vendora.ec2.createInstance |
| Service address | com.vendora.ec2.createInstaceRequest |
| Service orchestration | createInstance( ) |
| Request input parameter | Instance specification --> setInstanceSpec( ) |
| Mapping service | Create an elastic cloud server |
| | Disk specification --> setDisk(i).setDisk( ) |
| | Image name --> setImage( ) |
| | ... |
| Response mapping | getInstanceId --> Instance ID |
| | getRunningStatus( ) --> Creation status |
| | ... |

Metadata configured for the cloud service B provided by the cloud provider B may be shown in Table 5.

TABLE 5

| Mapping service | Create an elastic cloud server |
|---|---|
| Mapping manner | RESTful invocation |
| Provider | vender_b |
| Method mapping | (post)/v1/ec2/instance, (get)/v1/ec2/instance |
| Service address | HTTPS://ec2.cendorb.com/API |
| Service orchestration | 1. (post)/v1/ec2/instance |
| | 2. (GET)/v1/ec2/instance |
| Request input parameter | (POST)/v1/ec2/instance |
| | {spec: {instance specification}, |
| | disk:[disk: {disk specification}] |
| | image: {image name} |
| | ... } |
| Response mapping | (GET)/v1/ec2/instance |
| | {instanced: {instance ID}, |
| | runningStatus: {creation status}, |
| | ... } |

It can be learned from Table 4 and Table 5 that the metadata configured for the cloud service may include a meta service name mapped to the cloud service, a mapping manner of the cloud service, a provider, method mapping, a service address of the cloud service, specific API orchestration of the cloud service, a request input parameter of an API of the cloud service, response mapping, and the like.

The request input parameter of the cloud service may include but is not limited to an instance specification, a disk specification, an image name, and the like. The request input parameter may include all or some parameter types of the request input parameter of the metadata of the meta service.

The response mapping is a mapping relationship in which a cloud service response packet is mapped to the service response.

When the meta service (create an elastic cloud server) is initiated, a multi-cloud management server receives a service request for initiating "create an elastic cloud server". The service request carries information related to the meta service (create an elastic cloud server). The service request may include the service name of the meta service (create an elastic cloud server) and an instance specification, a disk specification, an image name, and the like of the elastic cloud server that is requested to be created. Because a mapping relationship between the meta service and the cloud service is preset by the multi-cloud management server, the multi-cloud management server may determine a to-be-invoked cloud service based on the service name carried in the service request. To be specific, when "create an elastic cloud server" is invoked, the cloud service provided by the provider A and the cloud service provided by the provider B may be separately invoked. A service or a resource included in the service request may be adapted, to select a specific to-be-invoked cloud service. The cloud service A may be invoked, or the cloud service B may be invoked, or the cloud service A and the cloud service B may be separately invoked.

If the cloud service A provided by the cloud provider A is invoked, a request input parameter in the service request includes a specific instance specification, disk specification, and image specification, and the like.

Then, the multi-cloud management server performs SDK invocation on the cloud service A. In this case, the meta service is mapped as a service method of the cloud provider A, namely, an address of the cloud service A. For details, refer to the method mapping (com.vendora.ec2.createInstance) in Table 4.

The multi-cloud management server maps, through a parameter, a request input parameter in a service request for invoking the meta service, and separately maps the setInstanceSpec( ) or the setImage( ) to the request, to convert the service request. The service request is converted into a request packet corresponding to a format of the request input parameter. The multi-cloud management server maps the request input parameter carried in the service request to metadata of a meta service A, and maps an instance specification, a disk specification, an image specification, and the like to the metadata of the cloud service A, to obtain a first packet structure of a request input parameter corresponding to the cloud service A, namely, data included in the request input parameter in Table 4. The first packet structure may include "Instance specification-->setInstanceSpec( )", "Disk specification-->setDisk(i).setDisk( )", "Image name-->setImage( )", and the like.

Then, the multi-cloud management server substitutes the request input parameter carried in the service request into the first packet structure, to generate the request packet. The request packet includes "Instance specification-->setInstanceSpec( )", "Disk specification-->setDisk(i).setDisk( )", and "Image name-->setImage( )". The instance specification, disk specification, and image specification are parameters obtained after the request input parameter in the service request is substituted. The multi-cloud management server sends the request packet to the cloud service A, to sequentially invoke the setInstanceSpec( ) the setImage( ) and the like.

After invocation is initiated, the multi-cloud management server receives an invocation result fed back by the cloud provider A through a response packet. A specific method for obtaining the invocation result is: "getInstanceId-->Instance ID" and "getRunningStatus( )-->Creation status". The response packet includes the instance ID and the creation status of "create an elastic cloud server". Then, the instance ID and the creation status carried in the response packet are mapped to the response mapping in Table 4, and the response packet is converted into a service response corresponding to the service response in Table 3. The service response includes the instance ID and the creation status. Then, the multi-cloud management server feeds back the service response to a network device.

A status of a created elastic cloud service may be determined based on the instance ID and the creation status carried in the service response, and the status includes whether the elastic cloud service is successfully created, a created ID, and the like.

If the cloud service B provided by the cloud provider B is invoked, an invocation process is similar to a manner of invoking the cloud service A. The cloud service B provided by the cloud provider B may be determined through metadata definition, and then RESTful invocation is executed. In this case, the meta service is mapped as a service method of the cloud provider B, and the method mapping in Table 5 is an address of the cloud service B. Then, each API of the cloud service B is invoked. Because service orchestration is performed on the cloud service B, two APIs of the cloud service B are invoked in sequence. Then, a parameter in a service request is mapped, through parameter mapping, to a request packet initiated for the cloud service B. To be specific, the request packet is converted to obtain a request packet corresponding to parameter mapping of the cloud service B. Then, the request packet is sent, based on the address of the cloud service B, to a cloud service device corresponding to the API of the cloud service B. After the cloud service B is invoked, the multi-cloud management server receives a response packet from the cloud provider B. The response packet includes specific information about the created elastic cloud server, including the creation status, the instance ID, and the like. Then, the multi-cloud management server converts, through response mapping, the response packet into a service response corresponding to the metadata of the meta service. Then, the service response is fed back to the network device. The creation status of the elastic cloud server may be determined based on the service response.

When a same meta service is invoked, the cloud service A provided by the provider A and the cloud service B provided by the provider B may be separately invoked based on the metadata. Therefore, the multi-cloud management server performs metadata configuration on information of an introduced cloud service through a data table, a JSON, an XML, and the like. There is no need to perform code adaptation on all parameters or the information of the introduced cloud service, deploy the cloud service at the meta service, perform a large amount of encoding, or the like.

In addition, if ten cloud services need to be introduced, adaptation of the ten cloud services is implemented through metadata definition. The multi-cloud management server first determines a mapping relationship between each of the ten cloud services and the meta service, and the mapping relationship is stored into the multi-cloud management server. The multi-cloud management server extracts parameters, information, or the like of the ten cloud services, and then performs the metadata definition on the information and the like of the ten cloud services. Metadata obtained by defining the ten cloud services is stored into the multi-cloud management server. The multi-cloud management server completes data conversion and invocation of the ten cloud services based on the metadata of each cloud service. If a cloud service needs to be introduced later, metadata of the introduced cloud service may be directly configured without encoding.

If ten cloud services are introduced through one-by-one code customization, each of the ten cloud services needs to be analyzed to extract information of each cloud service. Code adaptation is performed on the information and the like of each cloud service, such that each cloud service matches a corresponding meta service. Then, code compilation and packaging are performed. In addition, a corresponding cloud service is deployed on the corresponding meta service, and a plurality of cloud services are integrated and deployed. For example, an invocation interface, an input parameter, and the like of the corresponding cloud service are added. Therefore, a large amount of code is required to introduce the cloud service through one-by-one code customization and development. The more cloud services are introduced, the more code is required.

Therefore, in accordance with the present disclosure, one-by-one code customization is replaced with configuring the metadata of the meta service and the metadata of the cloud service. This can reduce an amount of code used for adapting the meta service and the cloud service, reduce a workload of adapting the meta service and the cloud service, and improve efficiency of introducing the cloud service.

Figure 6:
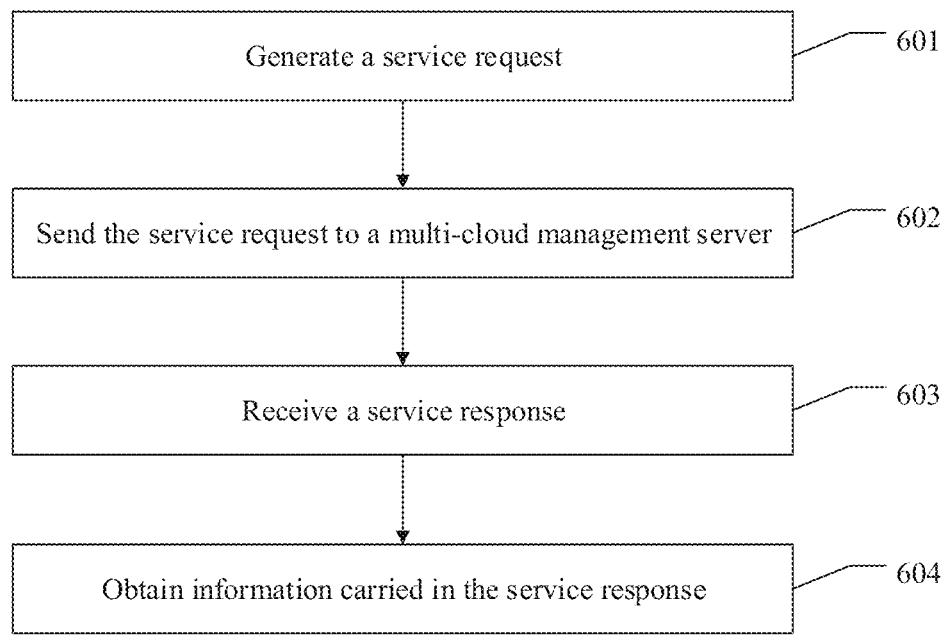
FIG. 6 is a schematic diagram of an embodiment of a network device side in a data processing method according to an embodiment of this application.

The foregoing describes in detail the specific procedure of the data processing method provided in accordance with the present disclosure and steps performed by the multi-cloud management server. The meta service is deployed on the network device. The network device may perform data generation, information extraction, and the like on the meta service based on the metadata, of the meta service, configured by the multi-cloud management server. The following describes steps performed by the network device in the data processing method provided in accordance with the present disclosure. FIG. 6 is a schematic diagram of another embodiment of a data processing method according to an embodiment of this application. The method includes the following steps.

601: Generate a service request.

First, a meta service is deployed on the network device, and the network device may be a terminal device, a server, or the like. The meta service is a service provided for a user. The meta service may be creating an elastic cloud server, a translation service, a navigation service, or the like. Metadata of the meta service is configured by a multi-cloud management server. A specific configuration process of the metadata of the meta service is similar to step 401 in FIG. 4 and step 501 in FIG. 5. Details are not described herein again.

When the meta service needs to be invoked, invocation information for the meta service may be entered by the user on the network device, or may be generated by the network device based on requirement information. The invocation information may include an access parameter for invoking the meta service. The network device generates, based on an arrangement format and the like included in the metadata of the meta service, a service request corresponding to the metadata of the meta service by using the invocation information. A parameter included in the service request matches the metadata of the meta service. For example, the service request includes all access parameters included in the metadata of the meta service. An arrangement sequence, a data type, and the like of the parameter included in the service request are the same as those of the access parameter included in the metadata of the meta service.

Further, the metadata of the meta service may be configured by the multi-cloud management server and then stored into the network device. A plurality of meta services may be deployed on one network device, and each meta service may correspond to different metadata. When the meta service is deployed, only an invocation interface, an input parameter, and the like of the meta service need to be deployed on the network device. The network device obtains the invocation information entered by the user or the invocation information generated by the network device based on a requirement and the like, and generates, by using the invocation information, based on the arrangement format and an expression format included in the metadata of the meta service, the service request corresponding to the meta service.

Therefore, according to this application, one-by-one code customization, code compilation and packaging, meta service deployment, integration and deployment of a plurality of cloud services, and the like do not need to be performed when the meta service is deployed. Deployment is performed based on information included in the metadata of the meta service. This simplifies a process of deploying the cloud service by the network device.

602: Send the service request to the multi-cloud management server.

After generating the service request, the network device sends the service request to the multi-cloud management server, and the multi-cloud management server invokes a cloud service corresponding to the service request. A specific step of invoking, by the multi-cloud management server, the corresponding cloud service is similar to the process of steps 404 to 409 in FIG. 4 and the process of steps 503 to 506 in FIG. 5. Details are not described herein again.

603: Receive a service response.

After the network device sends the service request to the multi-cloud management server, the multi-cloud management server invokes the corresponding cloud service, and converts an obtained cloud service response packet, to obtain a service response that matches the metadata of the meta service. Then, the network device may receive the service response from the multi-cloud management server through a wireless or wired network.

604: Obtain information carried in the service response.

A data format, a parameter type, and the like included in the service response match a data format, a parameter type, and the like included in the metadata of the meta service. Therefore, the information carried in the service response, namely, service data obtained by invoking the meta service, may be obtained based on the metadata of the meta service.

Further, after receiving the service response, the network device may match the service response with the metadata of the meta service, to obtain an arrangement format, of data in the service response, in the metadata of the meta service. Then, the network device extracts corresponding information in the service response based on the arrangement format. In this way, the information carried in the service response is obtained.

In actual application, if the network device is a terminal device having a display interface, or the network device is coupled to a device having a display interface, the network device may display, on the display interface, the information carried in the service response.

In one implementation, the meta service may be deployed on the network device based on the metadata of the meta service, the service request of the meta service is generated based on the metadata of the meta service, and the service response is parsed. There is no need to perform one-by-one code customization, code compilation and packaging, and meta service deployment for the meta service, or perform integration and deployment of a plurality of cloud services. Deployment is performed based on the information included in the metadata of the meta service. This simplifies the process of deploying the cloud service by the network device. In addition, the metadata of the meta service and the metadata of the cloud service may be used to convert the service request and the request packet between the meta service and the cloud service, and convert the response packet and the service response. This allows an invocation difference of the cloud service, reduces an amount of code used for adapting the meta service and the cloud service, and reduces a workload of adapting the meta service and the cloud service.

Figure 7:
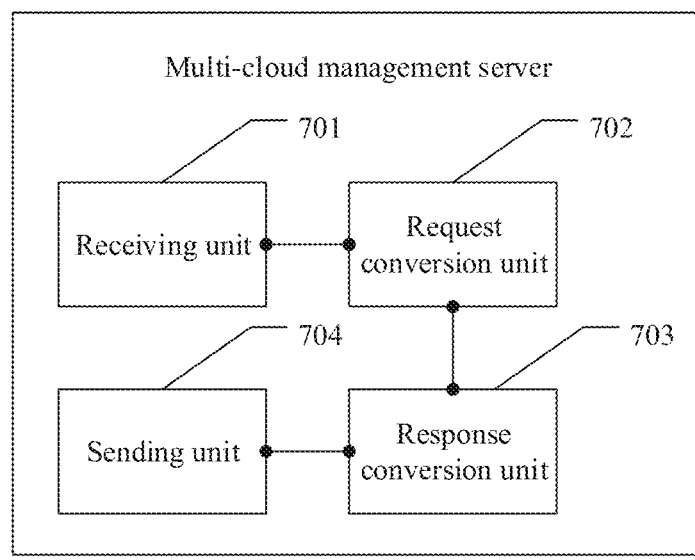
FIG. 7 is a schematic diagram of an embodiment of a multi-cloud management server according to an embodiment of this application.

The foregoing describes the specific procedure of the data processing method provided in accordance with the present disclosure. The following describes an apparatus provided in accordance with the present disclosure. FIG. 7 is a schematic diagram of an embodiment of a multi-cloud management server according to an embodiment of this application. The multi-cloud management server may include:

a receiving unit 701, configured to receive a service request, where the service request is used to request to invoke a meta service, the service request includes a parameter that matches metadata of the meta service, and the meta service is a service provided for a user;

a request conversion unit 702, configured to: convert the service request into a cloud service request packet based on metadata of a cloud service, and send the cloud service request packet, where the meta service corresponds to the cloud service, and the cloud service is a service provided for the meta service, where the receiving unit 701 is further configured to receive a cloud service response packet, and is further configured to implement step 408 in the embodiment corresponding to FIG. 4 and a specific implementation step performed by the multi-cloud management server in step 506 in the embodiment corresponding to FIG. 5;

a response conversion unit 703, configured to convert the cloud service response packet received by the receiving unit 701 into a service response that matches the metadata of the meta service; and a sending unit 704, configured to send the service response obtained through conversion performed by the response conversion unit 703.

In some embodiments, in some example implementations:

The metadata of the meta service has a first preset format, and the metadata of the meta service matches a parameter of the meta service.

The metadata of the cloud service has a second preset format, the metadata of the cloud service matches a parameter of the cloud service, and there is a mapping relationship between the metadata of the cloud service and the metadata of the meta service.

In some embodiments, in some example implementations, the request conversion unit 702 is further configured to:

obtain, based on the metadata of the meta service, information carried in the service request; and perform, based on the metadata of the cloud service, parameter mapping on the information carried in the service request, to obtain the cloud service request packet.

In some embodiments, in some example implementations, the request conversion unit 702 is further configured to:

determine, based on the mapping relationship between the metadata of the meta service and the metadata of the cloud service, a first packet structure, in the metadata of the cloud service, corresponding to the information carried in the service request, where the first packet structure includes an arrangement format, in the metadata of the cloud service, corresponding to the information carried in the service request; and generate the cloud service request packet based on the first packet structure and the information carried in the service request.

In some embodiments, in some example implementations, the response conversion unit 703 is further configured to:

obtain, based on the metadata of the cloud service, information carried in the cloud service response packet; and generate the service response based on the information carried in the cloud service response packet and the metadata of the meta service.

In some embodiments, in some example implementations, the response conversion unit 703 is further configured to:

determine, based on the mapping relationship between the metadata of the meta service and the metadata of the cloud service, a second packet structure, in the metadata of the meta service, corresponding to the information carried in the cloud service response packet, where the second packet structure includes an arrangement format, in the metadata of the meta service, corresponding to the information carried in the response packet; and generate the service response based on the second packet structure and the information carried in the response packet.

In some embodiments, in some example implementations:

The metadata of the meta service includes an access parameter and a response parameter that are of the meta service. The access parameter is a request parameter for invoking the meta service, and the response parameter is a parameter obtained after the meta service is invoked.

The metadata of the cloud service includes a mapping relationship, a service address, service orchestration, parameter mapping, and response mapping that are of the cloud service. The mapping relationship is used to indicate a relationship between the cloud service and the meta service. The service address is an address of the cloud service. The service orchestration is an arrangement manner of an application programming interface API corresponding to the cloud service. The parameter mapping is used to indicate an arrangement format and an expression format, of the access parameter of the meta service, in the metadata of the cloud service. The response mapping is used to indicate the information carried in the cloud service response packet and a corresponding arrangement format of the response parameter in the metadata of the meta service.

In some embodiments, in some example implementations, the sending unit 704 is further configured to:

after the service request is received and before the cloud service response packet is received, determine the cloud service corresponding to the service request; and send the cloud service request packet to at least one cloud service device that provides the cloud service.

Further, the receiving unit 701 is further configured to implement step 403 in the embodiment corresponding to FIG. 4 and a specific implementation step performed by the multi-cloud management server in step 502 in the embodiment corresponding to FIG. 5. The request conversion unit 702 is further configured to implement steps 404 to 406 in the embodiment corresponding to FIG. 4 and a specific implementation step performed by the multi-cloud management server in step 504 in the embodiment corresponding to FIG. 5. The response conversion unit 703 is further configured to implement step 409 in the embodiment corresponding to FIG. 4 and a specific implementation step performed by the multi-cloud management server in step 506 in the embodiment corresponding to FIG. 5. The sending unit 704 is further configured to implement a specific implementation step performed by the multi-cloud management server in step 410 in the embodiment corresponding to FIG. 4.

It should be noted that, in this implementation of this application, the request conversion unit 702 and the response conversion unit 703 may alternatively be a same component or unit, having a conversion function, on the multi-cloud management server. In other words, the same component or unit that has the conversion function may implement conversion between the service request and the cloud service request packet and implement conversion between the cloud service response packet and the service response.

Figure 8:
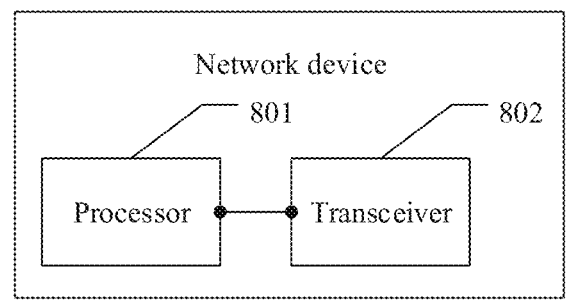
FIG. 8 is a schematic diagram of an embodiment of a network device according to an embodiment of this application.

FIG. 8 is a schematic diagram of an embodiment of a network device according to one implementation. The network device may include:

a processor 801, configured to generate a service request, where the service request is used to request to invoke a meta service, the service request includes a parameter that matches metadata of the meta service, and the meta service is a service deployed on the network device and provided for a user; and a transceiver 802, configured to send the service request generated by the processor 801, where the transceiver 802 is further configured to receive a service response, where the service response matches the metadata of the meta service, the service response is obtained by converting a cloud service response packet based on metadata of a cloud service, the cloud service is a service provided for the meta service, the cloud service corresponds to the meta service, and the cloud service response packet is obtained by invoking the cloud service.

In some embodiments, in some example implementations:

The processor 801 is further configured to: after the service response is received, obtain, based on the metadata of the meta service, information carried in the service response.

In some embodiments, in some example implementations:

The processor 801 is further configured to generate the service request based on the metadata of the meta service.

The transceiver 802 is further configured to send the service request to a multi-cloud management server, such that the multi-cloud management server obtains the service response.

In some embodiments, in some example implementations:

The metadata of the meta service has a first preset format, and the metadata of the meta service matches a parameter of the meta service.

The metadata of the cloud service has a second preset format, the metadata of the cloud service matches a parameter of the cloud service, and there is a mapping relationship between the metadata of the cloud service and the metadata of the meta service.

The metadata of the meta service may include an access parameter and a response parameter that are of the meta service. The access parameter is a request parameter for invoking the meta service, and the response parameter is a parameter obtained after the meta service is invoked.

The metadata of the cloud service may include a mapping relationship, a service address, service orchestration, parameter mapping, and response mapping that are of the cloud service. The mapping relationship is used to indicate a relationship between the cloud service and the meta service. The service address is an address of the cloud service. The service orchestration is an arrangement manner of an application programming interface API corresponding to the cloud service. The parameter mapping is used to indicate an arrangement format and an expression format, of the access parameter of the meta service, in the metadata of the cloud service. The response mapping is used to indicate information carried in the cloud service response packet and a corresponding arrangement format of the response parameter in the metadata of the meta service.

Figure 9:
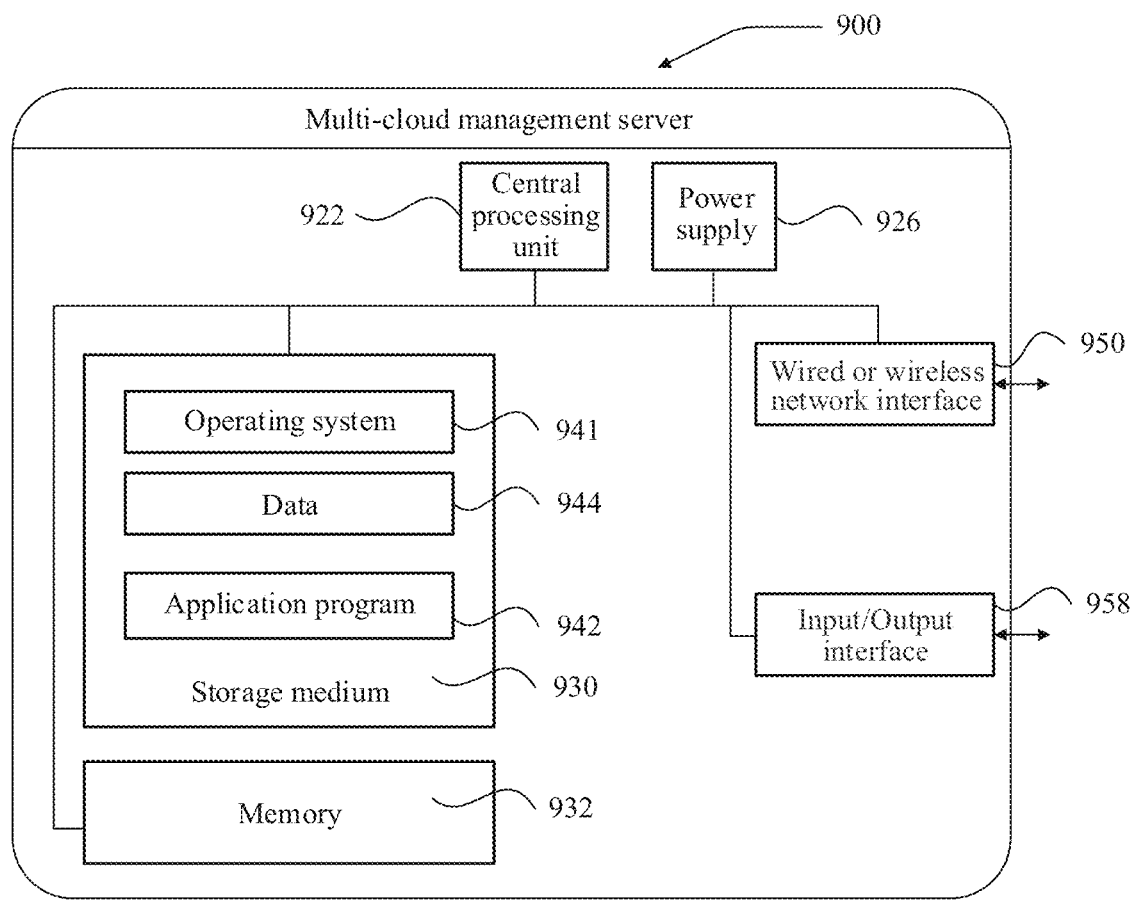
FIG. 9 is a schematic diagram of another embodiment of a multi-cloud management server according to an embodiment of this application.

FIG. 9 is a schematic diagram of another embodiment of a multi-cloud management server according to an embodiment of this application. The multi-cloud management server 900 may vary greatly due to different configurations or performance, and may include at least one central processing unit (CPU) 922 (for example, at least one processor), a memory 932, and at least one storage medium 930 (for example, at least one massive storage device) that stores an application program 942 or data 944. The memory 932 and the storage medium 930 may be used for temporary storage or permanent storage. A program stored in the storage medium 930 may include at least one module (not shown in the figure), and each module may include a series of instruction operations for the multi-cloud management server. Further, the central processing unit 922 may be configured to communicate with the storage medium 930, to perform, on the multi-cloud management server 900, the series of instruction operations in the storage medium 930.

The multi-cloud management server 900 may further include at least one power supply 926, at least one wired or wireless network interface 950, at least one input/output interface 958, and/or at least one operating system 941 such as Windows Server™, Mac OS X™, UNIX™, Linux™, and FreeBSD™.

Specific steps performed by the multi-cloud management server in FIG. 2 to FIG. 6 in the foregoing embodiments may be based on a structure of the multi-cloud management server shown in FIG. 9.

In accordance with the present disclosure, a network device may be a server, a terminal device, or the like. First, when the network device is a server, the network device is shown in FIG. 10.

Figure 10:
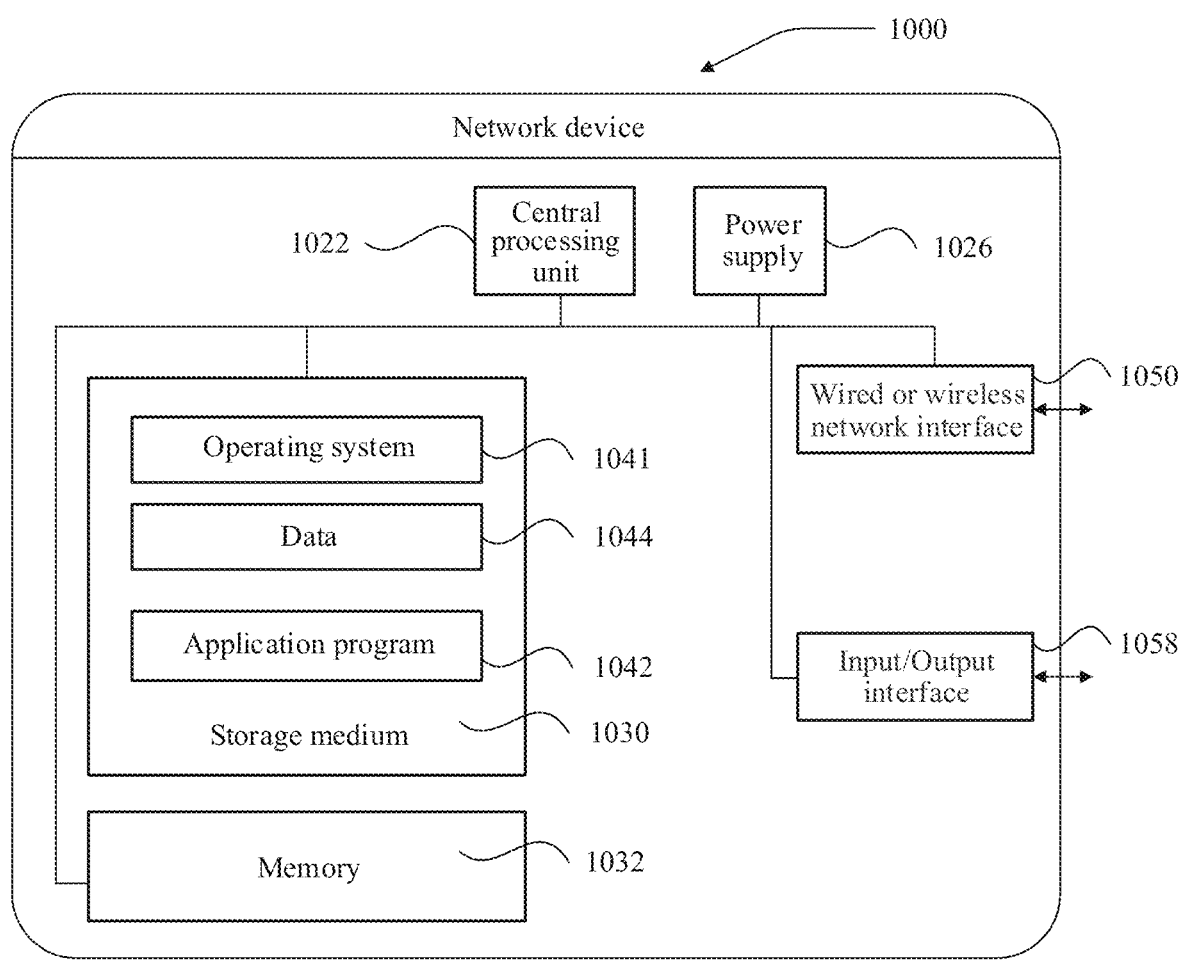
FIG. 10 is a schematic diagram of another embodiment of a network device according to an embodiment of this application.

FIG. 10 is a schematic diagram of another embodiment of a network device according to an embodiment of this application. The network device 1000 may vary greatly due to different configurations or performance, and may include at least one central processing unit (CPU) 1022 (for example, at least one processor), a memory 1032, and at least one storage medium 1030 (for example, at least one massive storage device) that stores an application program 1042 or data 1044. The memory 1032 and the storage medium 1030 may be used for temporary storage or permanent storage. A program stored in the storage medium 1030 may include at least one module (not shown in the figure), and each module may include a series of instruction operations for the network device. Further, the central processing unit 1022 may be configured to communicate with the storage medium 1030, to perform, on the network device 1000, the series of instruction operations in the storage medium 1030.

The network device 1000 may further include at least one power supply 1026, at least one wired or wireless network interface 1050, at least one input/output interface 1058, and/or at least one operating system 1041 such as Windows Server™, Mac OS X™, UNIX™, Linux™, and FreeBSD™.

Specific steps performed by the network device in FIG. 2 to FIG. 6 in the foregoing embodiments may be based on a structure of the network device shown in FIG. 10.

In addition, when the network device is a terminal device, the terminal device may be a mobile phone or a tablet computer device. A schematic diagram of the terminal device may be shown in FIG. 11.

For ease of description, only a part related to this embodiment is shown. For technical details that are not disclosed, refer to the methods in the embodiments of this application. The terminal may be any terminal device, including a tablet computer, a personal digital assistant (PDA), a point of sale(POS), a vehicle-mounted computer, or the like.

Figure 11:
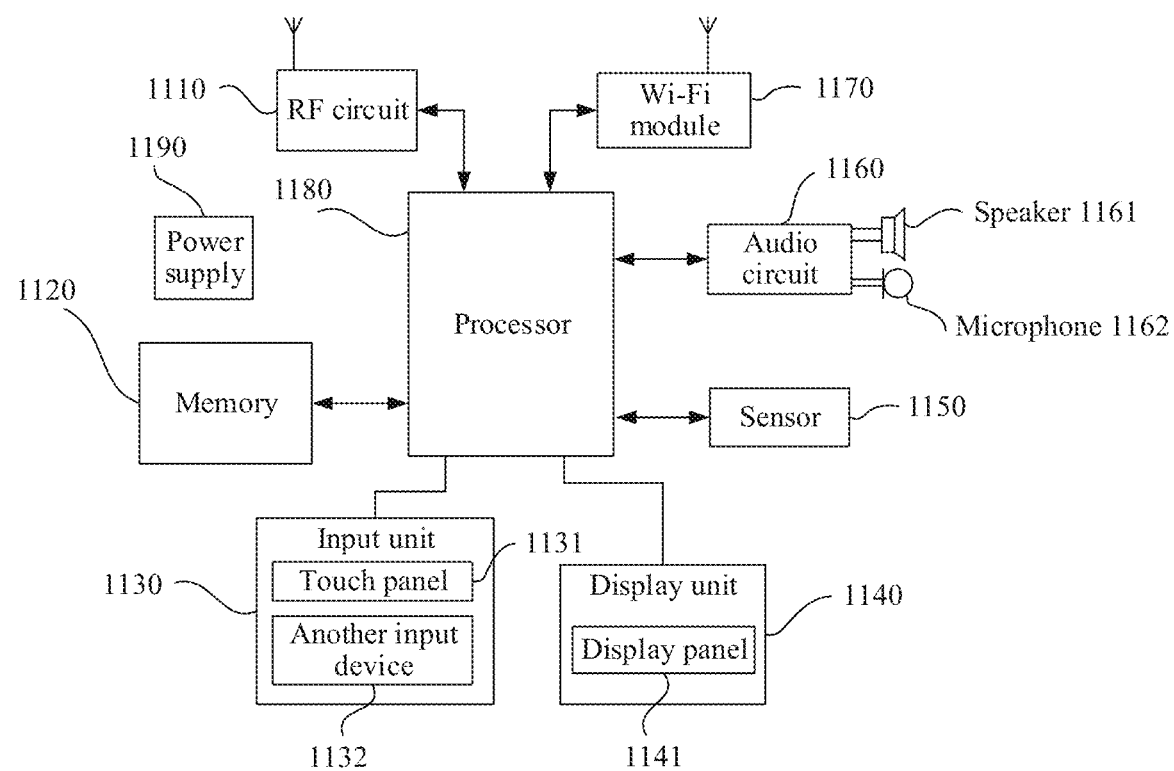
FIG. 11 is a schematic diagram of another embodiment of a network device according to an embodiment of this application.

FIG. 11 is a block diagram, of a part of a structure, in which a network device is a terminal device according to an embodiment of this application. Referring to FIG. 11, the terminal device includes components such as a radio frequency (RF) circuit 1110, a memory 1120, an input unit 1130, a display unit 1140, a sensor 1150, an audio circuit 1160, a wireless fidelity (Wi-Fi) module 1170, a processor 1180, and a power supply 1190. A person skilled in the art may understand that the structure of the terminal device shown in FIG. 11 does not constitute any limitation on the network device, and the network device may include more or fewer components than those shown in the figure, or combine some components, or have different component arrangements.

The following further describes constituent components of the terminal device with reference to FIG. 11.

The RF circuit 1110 may be configured to send and receive signals in an information sending and receiving process or a call process. Particularly, the RF circuit 1110 receives downlink information from a base station, and then delivers the downlink information to the processor 1180 for processing. In addition, the RF circuit 1110 sends designed uplink data to the base station. Usually, the RF circuit 1110 includes but is not limited to an antenna, at least one amplifier, a transceiver, a coupler, a low noise amplifier (LNA), a duplexer, and the like. In addition, the RF circuit 1110 may further communicate with a network and another device through wireless communication. Any communications standard or protocol may be used for the wireless communication, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The memory 1120 may be configured to store a software program and a module. The processor 1180 performs various function applications of the terminal device and data processing by running the software program and the module stored in the memory 1120. The memory 1120 may mainly include a program storage area and a data storage area. The program storage area may store an operating system, an application program required by at least one function (such as a sound playing function and an image playing function), and the like. The data storage area may store data (such as audio data and a phone book) created based on use of the terminal device, and the like. In addition, the memory 1120 may include a high speed random access memory, and may further include a nonvolatile memory such as at least one magnetic disk storage device and a flash memory device, or another volatile solid-state storage device.

The input unit 1130 may be configured to receive entered digit or character information, and generate key signal input related to a user setting and function control of the terminal device. Specifically, the input unit 1130 may include a touch panel 1131 and another input device 1132. The touch panel 1131, also referred to as a touchscreen, may collect a touch operation (for example, an operation performed by a user on or near the touch panel 1131 by using any suitable object or accessory such as a finger or a stylus) performed by the user on or near the touch panel 1131, and may drive a corresponding connection apparatus based on a preset program. In some embodiments, the touch panel 1131 may include two parts: a touch detection apparatus and a touch controller. The touch detection apparatus detects a touch direction and position of the user, detects a signal brought by the touch operation, and transmits the signal to the touch controller. The touch controller receives touch information from the touch detection apparatus, converts the touch information into touch point coordinates, then sends the touch point coordinates to the processor 1180, and receives and executes a command from the processor 1180. In addition, the touch panel 1131 may be implemented in a plurality of types, such as a resistive type, a capacitive type, an infrared type, and a surface acoustic wave type. The input unit 1130 may further include the another input device 1132 in addition to the touch panel 1131. Specifically, the another input device 1132 may include but is not limited to one or more of a physical keyboard, a function key (such as a volume control key or a power on/off key), a trackball, a mouse, a joystick, and the like.

The display unit 1140 may be configured to display information entered by the user or information provided for the user, and various menus of the terminal device. The display unit 1140 may include a display panel 1141. In some embodiments, the display panel 1141 may be configured in a form of a liquid crystal display (LCD), an organic light-emitting diode (OLED), or the like. Further, the touch panel 1131 may cover the display panel 1141. After the touch panel 1131 detects a touch operation on or near the touch panel 1131, the touch operation is transmitted to the processor 1180 to determine a type of a touch event. Then, the processor 1180 provides corresponding visual output on the display panel 1141 based on the type of the touch event. In FIG. 11, the touch panel 1131 and the display panel 1141 are used as two independent components to implement an input function and an output function of the terminal device. However, in some embodiments, the touch panel 1131 and the display panel 1141 may be integrated to implement the input function and the output function of the terminal device.

The terminal device may further include at least one sensor 1150, such as a light sensor, a motion sensor, and another sensor. Specifically, the light sensor may include an ambient light sensor and a proximity sensor. The ambient light sensor may adjust luminance of the display panel 1141 based on brightness of ambient light, and when the terminal device approaches an ear, the proximity sensor may turn off the display panel 1141 and/or backlight. As a type of motion sensor, an acceleration sensor can detect a value of an acceleration in each direction (usually three axes), and can detect a value and a direction of gravity when the acceleration sensor is static. The acceleration sensor is applicable to an application for recognizing a posture of the terminal device (such as landscape-to-portrait switch, a related game, and magnetometer posture calibration), a function related to vibration recognition (such as a pedometer or a knock), and the like. Other sensors such as a gyroscope, a barometer, a hygrometer, a thermometer, and an infrared sensor may also be configured for the terminal device. Details are not described herein again.

The audio circuit 1160, a speaker 1161, and a microphone 1162 may provide an audio interface between the user and the terminal device. The audio circuit 1160 may transmit, to the speaker 1161, an electrical signal obtained after conversion of received audio data, and then the speaker 1161 converts the electrical signal into a sound signal and outputs the sound signal. In addition, the microphone 1162 converts a collected sound signal into an electrical signal. The audio circuit 1160 receives the electrical signal and converts the electrical signal into audio data, and then outputs the audio data to the processor 1180 for processing. Then, processed audio data is sent to, for example, another mobile phone, through the RF circuit 1110, or the audio data is output to the memory 1120 for further processing.

Wi-Fi is a short distance wireless transmission technology. The terminal device may help, through the Wi-Fi module 1170, the user receive and send emails, browse a web page, access streaming media, and the like, to provide wireless broadband internet access for the user. A1 though FIG. 11 shows the Wi-Fi module 1170, it may be understood that the Wi-Fi module 1170 is not necessary for the terminal device, and may be omitted based on a requirement without changing the essence of this application.

The processor 1180 is a control center of the terminal device. The processor 1180 connects parts of the entire terminal device through various interfaces and lines, runs or executes the software program and/or the module stored in the memory 1120, and invokes the data stored in the memory 1120, to perform various functions of the terminal device and data processing, and perform overall monitoring on the terminal device. In some embodiments, the processor 1180 may include one or more processing units. Preferably, an application processor and a modem processor may be integrated into the processor 1180. The application processor mainly processes an operating system, a user interface, an application program, and the like. The modem processor mainly processes wireless communication. It can be understood that the modem processor may alternatively not be integrated into the processor 1180.

The terminal device further includes the power supply 1190 (for example, a battery) that supplies power to the components. Preferably, the power supply may be logically coupled to the processor 1180 through a power management system, to implement functions such as charge management, discharge management, and power consumption management through the power management system.

Although not shown, the terminal device may further include a camera, a Bluetooth module, and the like. Details are not described herein again.

In this embodiment, the processor 1180 included in the terminal may perform the steps performed by the network device in FIG. 2 to FIG. 6. In addition, in FIG. 2 to FIG. 6, steps of sending or receiving the service request or the service response performed by the network device may be sending or receiving performed by the Wi-Fi module 1170 or the RF circuit 1110 of the network device provided in FIG. 11.

Figure 12:
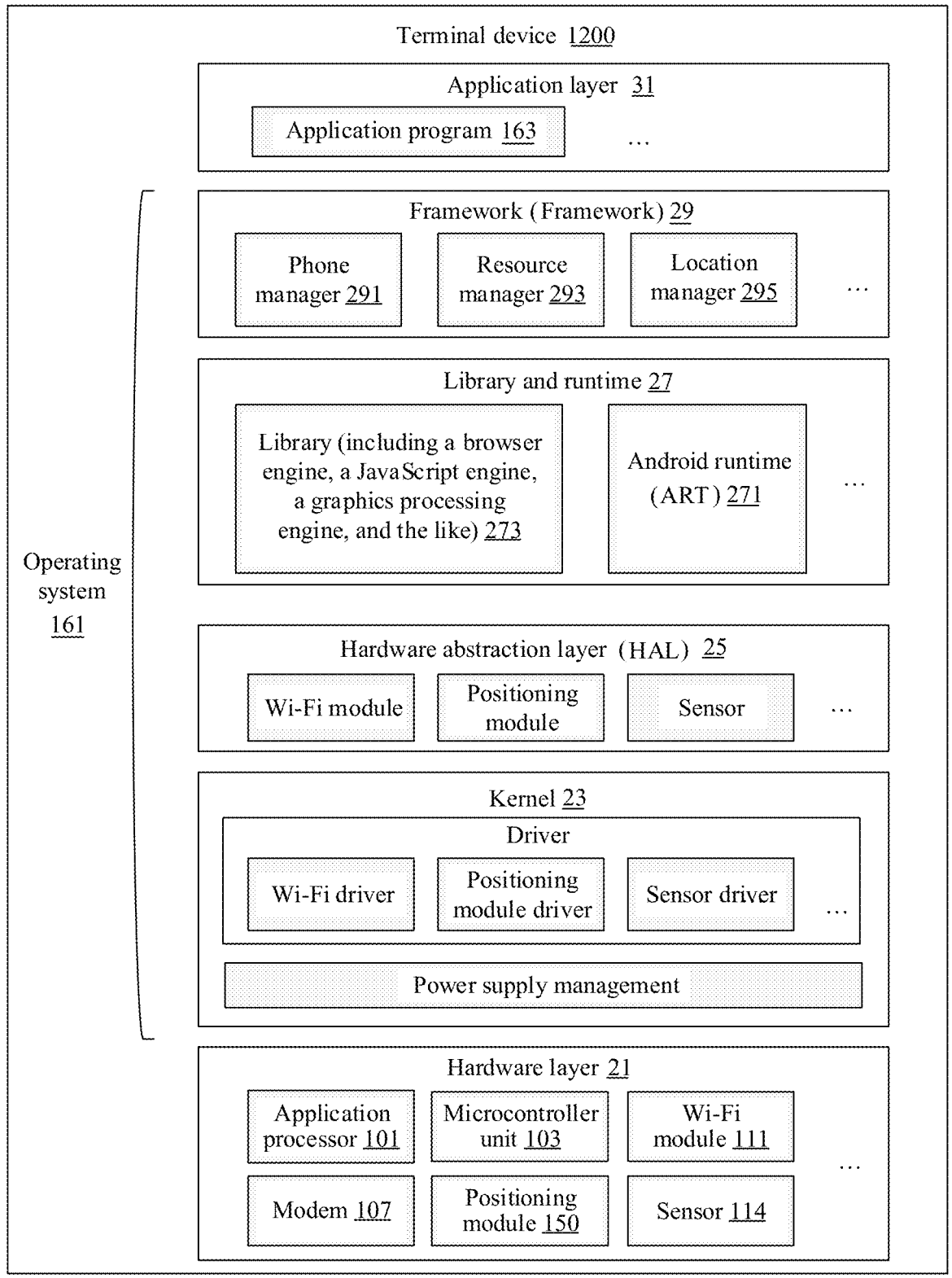
FIG. 12 is a schematic diagram of another embodiment of a network device according to an embodiment of this application.

In another implementation, when the network device is a terminal device, the terminal device may alternatively be shown in FIG. 12. The terminal device may be any device that has a sending and receiving function. The terminal device may be a mobile phone, a tablet computer, an in-vehicle mobile apparatus, a PDA (personal digital assistant), a camera, a wearable device, or the like. Certainly, a specific form of the terminal device is not limited in the following embodiment. In addition, a system that may be carried by the terminal device may include iOS®, Android®, Microsoft®, Linux®, or another operating system. This is not limited in this embodiment.

A terminal device 1200 carrying an Android® operating system is used as an example. As shown in FIG. 12, the terminal device 1200 may be logically divided into a hardware layer 21, an operating system 161, and an application layer 31. The hardware layer 21 includes hardware resources such as an application processor 101, a microcontroller unit 103, a modem 107, a Wi-Fi module 111, a sensor 114, and a positioning module 150. The application layer 31 includes one or more application programs, for example, an application program 163. The application program 163 may be any type of application program such as a social application, an e-commerce application, or a browser. The operating system 161 is used as software middleware between the hardware layer 21 and the application layer 31, and is a computer program for managing and controlling hardware and a software resource.

In an embodiment, the operating system 161 includes a kernel 23, a hardware abstraction layer (HAL) 25, library and runtime (library and runtime) 27, and a framework (framework) 29. The kernel 23 is configured to provide an underlying system component and a service, for example, power management, memory management, thread management, or a hardware driver. The hardware driver includes a Wi-Fi driver, a sensor driver, a positioning module driver, or the like. The hardware abstraction layer 25 encapsulates a kernel driver, provides an interface for the framework 29, and shields implementation details of a lower layer. The hardware abstraction layer 25 runs in user space, and the kernel driver runs in kernel space.

The library and runtime 27 is also referred to as a runtime library, and provides a required library file and an execution environment for an executable program during running. The library and runtime 27 includes Android runtime (ART) 271, a library 273, and the like. The ART 271 is a virtual machine or a virtual machine instance that can convert bytecode of an application program into machine code. The library 273 is a program library that provides support for the executable program during running, and includes a browser engine (for example, webkit), a script execution engine (for example, a JavaScript engine), a graphics processing engine, and the like.

The framework 29 is configured to provide various basic common components and services, such as window management and location management, for an application program at the application layer 31. The framework 29 may include a phone manager 291, a resource manager 293, a location manager 295, and the like.

All functions of components in the operating system 161 described above may be implemented by the application processor 101 by executing a program stored in a memory 105.

In addition, the steps performed by the network device in FIG. 2 to FIG. 6 may be performed by the application processor 101 in the network device, for example, generating a service request and extracting information in a service response. In addition, steps of sending or receiving the service request or the service response performed by the network device may be sending or receiving performed by the Wi-Fi module 111 provided at the hardware layer in FIG. 12 or performed by another module or component that has a data transmission function.

A person skilled in the art may understand that the terminal 1200 may include fewer or more components than those shown in FIG. 12. The terminal device shown in FIG. 12 includes only components more related to a plurality of implementations disclosed in the embodiments of this application.

In addition, in one implementation, a network connection between the network device and a multi-cloud management server or between the multi-cloud management server and a cloud service device may be established through a communications system corresponding to a wireless or wired network. Specifically, the communications system is, for example, code division multiple access (CDMA), time division multiple access (TDMA), frequency division multiple access (FDMA), orthogonal frequency division multiple access (OFDMA), single carrier frequency division multiple access (SC-FDMA), or another system. The terms "system" and "network" can be interchanged with each other. A wireless technology such as universal terrestrial radio access (UTRA) or CDMA2000 may be implemented in the CDMA system. UTRA may include a wideband CDMA (WCDMA) technology and another variation technology of CDMA. CDMA2000 may cover the interim standard (IS) 2000 (IS-2000), the IS-95 standard, and the IS-856 standard. A radio technology such as a global system for mobile communications (GSM) may be implemented in the TDMA system. A radio technology such as evolved universal terrestrial radio access (E-UTRA), ultra mobile broadband (UMB), IEEE 802.11 (Wi-Fi), IEEE 802.16 (WiMAX), IEEE 802.20, or Flash OFDMA may be implemented in the OFDMA system. UTRA corresponds to UMTS, and E-UTRA corresponds to an evolved release of UMTS. A new release of UMTS, namely, E-UTRA, is used in 3GPP long term evolution (LTE) and various releases evolved based on LTE. A fifth generation (5G) communications system and a new radio (NR) are next-generation communications systems that are under research. In addition, the communications system is further applicable to a future-oriented communications technology, and may be applied to the technical solutions provided in the embodiments of this application.

A person skilled in the art may be clearly understood that, for convenient and brief description, for a detailed working process of the foregoing system, apparatus, and unit, refer to a corresponding process in the foregoing method embodiments. Details are not described herein again.

In the embodiments provided in accordance with the present disclosure, it should be understood that the disclosed system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual coupling or a direct coupling or a communication connection may be implemented by using some interfaces. An indirect coupling or a communication connection between the apparatuses or units may be implemented in an electronic form, a mechanical form, or in another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or another network device) to perform all or some of the steps of the methods in the embodiments in FIG. 2 to FIG. 6 herein. The foregoing storage medium includes various media that may store program code, such as a USB flash drive, a removable hard disk, a read-only memory (ROM), a random access memory (RAM), a magnetic disk, and an optical disc.

In conclusion, the foregoing embodiments are merely intended for describing the technical solutions of this application, but not for limiting this application. A1 though this application is described in detail with reference to the foregoing embodiments, a person of ordinary skill in the art should understand that modifications may still be made to the technical solutions described in the foregoing embodiments or make equivalent replacements to some technical features thereof, without departing from the scope of the technical solutions of the embodiments of this application.

What is claimed is:

1. A method being implemented by a cloud management computer server, the method comprising:
    receiving a first service request from a network device, wherein the first service request has a first preset format, wherein the first service request is used to invoke a meta service, wherein the first service request comprises a parameter that matches metadata of the meta service, and wherein the meta service is a service provided for a user and corresponds to a first cloud service and a second cloud service in a multi-cloud environment;
    translating the first service request into a second service request based on a mapping relationship between the meta service and the first and second cloud services, wherein the second service request has a second preset format that supports invoking the first cloud service and the second cloud service, wherein the translating is based on matching the metadata of the meta service and metadata of the first and second cloud services according to a mapping relationship between the first preset format and the second preset format, and wherein the mapping relationship between the first preset format and the second preset format indicates first information from the network device and second information from the first and second cloud services;
    sending the second service request to at least one cloud service device in the multi-cloud environment;
    invoking the first cloud service corresponding to the meta service and obtaining a first invocation result;
    invoking the second cloud service corresponding to the meta service and obtaining a second invocation result; and
    providing, to the network device, the first invocation result and the second invocation result as a service response to invoking the meta service.

2. The method according to claim 1, wherein the first information comprises first data from the network device, and the second information comprises second data that is processed by applications in the first and second cloud services.

3. The method according to claim 1, wherein the first and second cloud services are different cloud services provided by different cloud service providers.

4. The method according to claim 1, further comprising:
    receiving, from the at least one cloud service device, a first response packet for the second service request, wherein the first response packet has the second preset format;
    translating, based on the metadata of the meta service and the metadata of the first and second cloud services, the first response packet into a second response packet that has the first preset format; and
    sending the second response packet to the network device.

5. The method according to claim 4, wherein the first response packet is obtained based on processing performed by the first and second cloud services based on the second service request.

6. A server, comprising:
    a memory configured to store a program; and
    a processor configured to execute the program stored in the memory, wherein when the program is executed by the processor, the server is caused to:
        receive a first service request from a network device, wherein the first service request has a first preset format, wherein the first service request is used to invoke a meta service, wherein the first service request comprises a parameter that matches metadata of the meta service, and wherein the meta service is a service provided for a user and corresponds to a first cloud service and a second cloud service in a multi-cloud environment;
        translate the first service request into a second service request based on a mapping relationship between the meta service and the first and second cloud services, wherein the second service request has a second preset format that supports invoking the first cloud service and the second cloud service, wherein the translating is based on matching the metadata of the meta service and metadata of the first and second cloud services according to a mapping relationship between the first preset format and the second preset format, and wherein the mapping relationship between the first preset format and the second preset format indicates first information from the network device and second information from the first and second cloud services;

send the second service request to at least one cloud service device in the multi-cloud environment;

invoke the first cloud service corresponding to the meta service and obtain a first invocation result;

invoke the second cloud service corresponding to the meta service and obtain a second invocation result; and provide, to the network device, the first invocation result and the second invocation result as a service response to invoking the meta service.

7. The server according to claim 6, wherein the first information comprises first data from the network device, and the second information comprises second data that is processed by applications in the first and second cloud services.

8. The server according to claim 6, wherein when the program is executed by the processor, the server is further caused to:

receive, from the at least one cloud service device, a first response packet for the second service request, wherein the first response packet has the second preset format;

translate, based on the metadata of the meta service and the metadata of the first and second cloud services, the first response packet into a second response packet that has the first preset format; and send the second response packet to the network device.

9. The method according to claim 1, further comprising:

integrating the first invocation result and the second invocation result to generate an integrated invocation result, wherein the service response comprises the integrated invocation result.

10. The server according to claim 6, wherein when the program is executed by the processor, the server is further caused to:

integrate the first invocation result and the second invocation result to generate an integrated invocation result, wherein the service response comprises the integrated invocation result.

11. A non-transitory computer readable storage medium comprising instructions that, when executed by a processor of a computing device, cause the computing device to:

receive a first service request from a network device, wherein the first service request has a first preset format, wherein the first service request is used to invoke a meta service, wherein the first service request comprises a parameter that matches metadata of the meta service, and wherein the meta service is a service provided for a user and corresponds to a first cloud service and a second cloud service in a multi-cloud environment;

translate the first service request into a second service request based on a mapping relationship between the meta service and the first and second cloud services, wherein the second service request has a second preset format that supports invoking the first cloud service and the second cloud service, wherein the translating is based on matching the metadata of the meta service and metadata of the first and second cloud services according to a mapping relationship between the first preset format and the second preset format, and wherein the mapping relationship between the first preset format and the second preset format indicates first information from the network device and second information from the first and second cloud services;

send the second service request to at least one cloud service device in the multi-cloud environment;

invoke the first cloud service corresponding to the meta service and obtain a first invocation result;

invoke the second cloud service corresponding to the meta service and obtain a second invocation result; and provide, to the network device, the first invocation result and the second invocation result as a service response for invokin to invoking the meta service.

12. The non-transitory computer readable storage medium of claim 11, wherein the first information comprises first data from the network device, and the second information comprises second data that is processed by applications in the first and second cloud services.

13. The non-transitory computer readable storage medium of claim 11, wherein the instructions, when executed by the processor of the computing device, further cause the computing device to:

receive, from the at least one cloud service device, a first response packet for the second service request, wherein the first response packet has the second preset format;

translate, based on the metadata of the meta service and the metadata of the first and second cloud services, the first response packet into a second response packet that has the first preset format; and send the second response packet to the network device.

14. The non-transitory computer readable storage medium of claim 11, wherein the first response packet is obtained based on processing by the first and second cloud services based on the second service request.

15. The non-transitory computer readable storage medium of claim 11, wherein the instructions, when executed by the processor of the computing device, further cause the computing device to:

integrate the first invocation result and the second invocation result to generate an integrated invocation result, wherein the service response comprises the integrated invocation result.

* * * * *

UNITED STATES PATENT AND TRADEMARK OFFICE
CERTIFICATE OF CORRECTION

PATENT NO. : 11,765,243 B2
APPLICATION NO. : 17/105539
DATED : September 19, 2023
INVENTOR(S) : Lu et al.

It is certified that error appears in the above-identified patent and that said Letters Patent is hereby corrected as shown below:

In the Claims

Claim 11: Column 52, Line 28: "response for invokin to invoking the meta service." should read -- response to invoking the meta service. --.

Signed and Sealed this
Ninth Day of January, 2024

Katherine Kelly Vidal
Director of the United States Patent and Trademark Office